United States Patent
Morgan

(10) Patent No.: US 11,935,145 B2
(45) Date of Patent: Mar. 19, 2024

(54) ENHANCED SAFETY TRACKING IN REAL ESTATE TRANSACTIONS

(71) Applicant: Quitchet, LLC, Greenville, SC (US)

(72) Inventor: Robert Mahon Morgan, Greenville, SC (US)

(73) Assignee: QUITCHET, LLC, Greenville, SC (US)

(*) Notice: Subject to any disclaimer, the term of this patent is extended or adjusted under 35 U.S.C. 154(b) by 218 days.

(21) Appl. No.: 17/670,181

(22) Filed: Feb. 11, 2022

(65) Prior Publication Data
US 2022/0164906 A1    May 26, 2022

Related U.S. Application Data

(63) Continuation-in-part of application No. 16/155,368, filed on Oct. 9, 2018, now abandoned, which is a
(Continued)

(51) Int. Cl.
*G06Q 50/16* (2012.01)
*G08B 21/02* (2006.01)
(Continued)

(52) U.S. Cl.
CPC .............. *G06Q 50/16* (2013.01); *G08B 21/02* (2013.01); *H04W 4/021* (2013.01); *H04W 4/029* (2018.02)

(58) Field of Classification Search
CPC .... G06Q 50/16; G06Q 30/06; G06Q 10/1095; G06Q 50/01; G06Q 10/1093;
(Continued)

(56) References Cited

U.S. PATENT DOCUMENTS 5,839,088 A    11/1998  Hancock et al.
6,202,023 B1    3/2001  Hancock et al.
(Continued)

FOREIGN PATENT DOCUMENTS

WO    2015030683 A1    3/2015

OTHER PUBLICATIONS

"My Guardian: A personal safety mobile application" 2018 IEEE Conference on Open Systems (ICOS) Feninferina Azman, Qistina Suraya, Fiza Abdul Rahim, Muhammad Sufyian Mohd Azmi, Noor Afiza Mohd Ariffin (Year: 2018).*

*Primary Examiner* — Alexandru Cirnu
(74) *Attorney, Agent, or Firm* — Bryan L. Baysinger; Maynard Nexsen PC

(57) ABSTRACT

Disclosed are various aspects of computer-implemented systems and methods for enhancing safety in real estate transactions. In one aspect a user is provisioned with a real estate mobile application with a safety engine on a mobile computing device. Next, the user enters parameters or the application automatically populates parameters based off at least a safety timer limit, a time extension amount, an emergency contact, a timer authentication code, or an emergency code. Next, a user selects a property and visits, wherein the application initiates GPS tracking and checks the user in. The user's property visits, check in and check out are logged and streamed to a database for verification. If the user fails to check out or respond to the timer authentication code an emergency service is alerted and or the device emits an emergency audible sound.

18 Claims, 46 Drawing Sheets

Related U.S. Application Data continuation-in-part of application No. 15/056,181, filed on Feb. 29, 2016, now abandoned.

(60) Provisional application No. 62/128,845, filed on Mar. 5, 2015.

(51) Int. Cl.
  *H04W 4/021* (2018.01)
  *H04W 4/029* (2018.01)

(58) Field of Classification Search
  CPC ..... G08B 21/02; G08B 25/016; H04W 4/021; H04W 4/029; H04W 4/90; G06F 2221/2111; G06F 21/31; H04M 1/72451; H04M 1/72457; H04M 1/72421; H04L 51/214; H04L 63/083; H04L 69/28; H04L 51/52
  See application file for complete search history.

(56) References Cited

U.S. PATENT DOCUMENTS

| | | | |
|---|---|---|---|
| 6,356,834 B2 | 3/2002 | Hancock et al. | |
| 6,385,541 B1 | 5/2002 | Blumberg et al. | |
| 6,496,776 B1 | 12/2002 | Blumberg et al. | |
| 6,597,983 B2 | 7/2003 | Hancock | |
| 6,609,062 B2 | 8/2003 | Hancock | |
| 6,973,432 B1 | 12/2005 | Woodward et al. | |
| 7,072,665 B1 | 7/2006 | Blumberg et al. | |
| 7,333,943 B1 | 2/2008 | Charuk et al. | |
| 7,454,355 B2 | 11/2008 | Milman et al. | |
| 7,457,628 B2 | 11/2008 | Blumberg et al. | |
| 7,599,795 B1 | 10/2009 | Blumberg et al. | |
| 7,793,658 B2 | 9/2010 | Stratton | |
| 7,987,113 B2 | 7/2011 | Blumberg et al. | |
| 7,991,702 B2 | 8/2011 | Marino | |
| 8,165,939 B1* | 4/2012 | Reass | G06Q 20/10 705/35 |
| 8,270,933 B2 | 9/2012 | Riemer | |
| 8,442,550 B2 | 5/2013 | Blumberg et al. | |
| 8,473,199 B2 | 6/2013 | Blumberg et al. | |
| 8,731,581 B2 | 5/2014 | Blumberg et al. | |
| 8,935,220 B2 | 1/2015 | Hancock et al. | |
| 9,002,371 B1 | 4/2015 | Blumberg et al. | |
| 9,122,704 B2 | 9/2015 | Blumberg et al. | |
| 9,183,584 B2 | 11/2015 | Blumberg et al. | |
| 2001/0047282 A1 | 11/2001 | Raveis, Jr. | |
| 2002/0022980 A1 | 2/2002 | Mozayeny et al. | |
| 2003/0078897 A1 | 4/2003 | Florance et al. | |
| 2005/0203768 A1 | 9/2005 | Florance et al. | |
| 2005/0288958 A1 | 12/2005 | Eraker et al. | |
| 2006/0106628 A1 | 5/2006 | Faherty et al. | |
| 2007/0276746 A1 | 11/2007 | Michonski | |
| 2008/0284587 A1 | 11/2008 | Saigh et al. | |
| 2009/0259568 A1 | 10/2009 | Lee | |
| 2010/0216509 A1 | 8/2010 | Riemer | |
| 2011/0055247 A1 | 3/2011 | Blumberg et al. | |
| 2011/0184873 A1* | 7/2011 | Wilson | G06Q 50/16 705/313 |
| 2011/0275441 A1 | 11/2011 | Wilson | |
| 2013/0052982 A1 | 2/2013 | Rohde et al. | |
| 2013/0124367 A1 | 5/2013 | Ray | |
| 2013/0137464 A1 | 5/2013 | Kramer | |
| 2013/0183924 A1* | 7/2013 | Saigh | A61K 9/08 455/404.2 |
| 2013/0252034 A1 | 9/2013 | Hu et al. | |
| 2013/0317902 A1 | 11/2013 | Musiov | |
| 2014/0019184 A1 | 1/2014 | Herickhoff et al. | |
| 2014/0026094 A1 | 1/2014 | Zimmerman | |
| 2014/0136624 A1 | 5/2014 | Abhyanker | |
| 2014/0222620 A1 | 8/2014 | Polson | |
| 2014/0226586 A1 | 8/2014 | Kimura et al. | |
| 2014/0237053 A1 | 8/2014 | Abhyanker | |
| 2014/0279237 A1* | 9/2014 | Cole | G06Q 30/0617 705/26.43 |
| 2014/0304178 A1 | 10/2014 | Bengson | |
| 2014/0317696 A1 | 10/2014 | Abhyanker | |
| 2015/0066787 A1 | 3/2015 | Jedrzejczyk | |
| 2015/0170299 A1 | 6/2015 | Wilson et al. | |
| 2015/0206218 A1 | 7/2015 | Banerjee et al. | |
| 2016/0127484 A1* | 5/2016 | Hornor | H04W 72/53 709/224 |
| 2016/0247221 A1 | 8/2016 | Blumberg et al. | |
| 2017/0236173 A1 | 8/2017 | Mason | |
| 2018/0232823 A1* | 8/2018 | Steel | G06Q 50/16 |
| 2018/0300826 A1* | 10/2018 | Weiss | G06Q 40/03 |
| 2020/0344573 A1* | 10/2020 | Hornor | H04L 45/00 |

\* cited by examiner

ADVANCED SEARCH

| |
|---|
| HOMES FOR SALE |
| HOMES UNDER CONTRACT |
| HOMES RECENTLY |
| PRICE   SELECT |
| BEDS   SELECT |
| BATHS   SELECT |
| TYPE   SINGLE, MULTI FAMILY, CONDO/APARTMENT |
| KEY WORDS |
| NAME THIS SEARCH FILTER (THIS WILL BE SAVED IN YOUR "SAVED SEARCHES") |

PRICE
MIN     TO MAX
OK

SAVE & SEARCH     SEARCH

SEARCH BY CITY, STATE, SCHOOL

SHOWING FEEDBACK

WHAT ARE YOUR GENERAL OBSERVATION/COMMENTS ON THIS HOME?

ENTER COMMENTS HERE

WHAT DO YOU THINK OF THE PRICE?
AT MARKET VALUE ✓
OTHER
NO RESPONSE

RATE THE EXTERIOR
AVERAGE ✓
WELL MAINTAINED
POOR
OTHER
NO RESPONSE

RATE THE INTERIOR
AVERAGE ✓
WELL MAINTAINED
POOR
OTHER
NO REPONSE

ARE YOU CONSIDERING MAKING AN OFFER?
YES ✓
POSSIBLY
NO
OTHER
NO RESPONSE

< CANCEL        SEND

SEARCH BY CITY, STATE, SCHOOL

BACK TO SEARCH | CHAT WITH MY AGENT

AGENT
SHOWINGS FOR: MONDAY 12/01/2014 — EMAIL | CALL

I VIEWED THIS HOME ✓

$324,900
123 A STREET
A PLACE
5 BEDROOMS
3 BATHROOMS
3,560 SQ FT — DIRECTIONS

I VIEWED THIS HOME ✓
I LEFT FEEDBACK ✓

$319,900
123 B STREET
A PLACE
5 BEDROOMS
3 BATHROOMS
3,560 SQ FT — DIRECTIONS

APPOINTMENT TIME
10:00AM - 11:00AM $317,900
123 C STREET
A PLACE
4 BEDROOMS
3 BATHROOMS
3,200 SQ FT — DIRECTIONS

SHOWINGS FOR: TUESDAY 12/02/2014
ANOTHER AGENT — EMAIL | CALL

APPOINTMENT TIME
10:00AM - 11:00AM $317,900
123 C STREET
A PLACE
4 BEDROOM

ENHANCED SAFETY TRACKING IN REAL ESTATE TRANSACTIONS

CROSS-REFERENCE TO RELATED APPLICATIONS

This is a continuation-in-part of U.S. patent application Ser. No. 16/155,368 filed on Oct. 9, 2018, entitled "Social Network Application for Real Estate," which is a continuation-in-part of U.S. patent application Ser. No. 15/056,181 filed on Feb. 29, 2016, entitled "Social Network Application for Real Estate," which claims priority to U.S. patent application Ser. No. 62/128,845 filed on Mar. 5, 2015, entitled "Social Network Application for Real Estate," the disclosures of which are incorporated herein by reference in their entireties.

FIELD OF THE INVENTION

The present invention relates to a computer implemented system and method and a software application for providing safety tracking during residential real estate transactions. Namely, utilizing an application executing on a mobile computing device to track a user's progress through a home tour or visit, and initiating emergency responses if certain inquiries or parameters are triggered.

BACKGROUND OF THE INVENTION

The housing market in the United States is an essential building block for the entire economy. Large numbers of residential real estate transactions have the potential for overwhelming the entire system. One common fear with real estate transactions is risk to the buyer and the agent when visiting properties. Not only from dangers on the property such as damaged flooring or other hazards, but of physical assault or other dangers such as sudden medical conditions.

The National Association of Realtors recognizes the inherent risk and publishes safety tips and guides. However, even the most cautious of visits can result in unforeseen danger. For example, a realtor showing with a buyer may become glycemic or otherwise faint or fall ill. If the buyer is not equipped to handle the emergency serious injury may occur.

Given the volume of real estate transactions, the chance of harm on properties, and the inherent risk of visiting an unknown location, there exists a need in the marketplace to ensure realtor and buyer safety. Further, there exists a need to help strengthen existing protocols with automated and computer implemented solutions utilizing technology to assist in situations when the user may be rendered unavailable to respond.

SUMMARY OF THE INVENTION

The present disclosure provides a safety tracking engine and protocols and parameters that execute on a user's phone that help track and assist users during real estate transactions. Various aspects of hardware and software, including executing processing units, memory, and other devices may be utilized to accomplish the methods and systems herein. In one aspect a computer-implemented method for enhancing safety in real estate transactions is disclosed. In the example method a user is provisioned with mobile computing device configured with a real estate mobile application. Next, the user or the application populates parameters, including at least one of the following: safety timer limit, time extension amount, emergency contact, timer authentication code, or emergency code. Next, the user selects properties to view from the real estate mobile application, wherein selecting also selects a time slot and an address of the property. Next, the safety engine on the real estate mobile application initiates when the user is at or near the property to be viewed. The application prompts a user check in or the GPS module will automatically check the user in when at the property to be viewed. Once checked in a timer initiates and begins keeping track of the time the user spends on the property. If the user fails to check out a timer may show a check out authentication code to end the check-out timer. If the user fails to enter the code or does not check out after a specified period of time the application may alert an emergency contact or a local emergency medical situation hotline, in doing so it may send the user's GPS coordinates or last known destination.

BRIEF DESCRIPTION OF THE DRAWINGS

FIG. 4-41 depicts a display screen as it appears on a mobile app.

FIG. 44 is an illustration of an example user interface wherein toggles for emergency contact may be entered.

FIG. 45 is an illustration of an example user interface with a check in button along with GPS enabled checking in.

DETAILED DESCRIPTION

Figure 1:
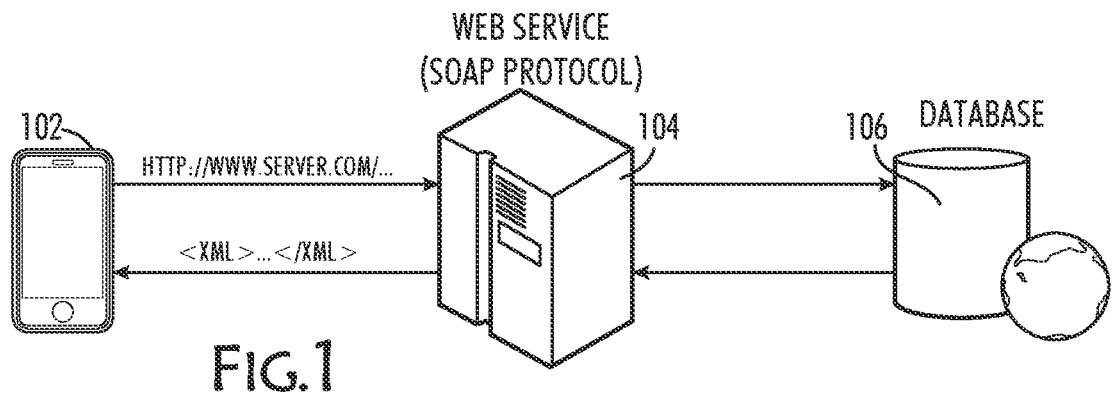
FIG. 1 schematically illustrates the operation of a social network in which a networked mobile wireless telecommunication computing device communicates with a web server which in turn communicates with one or more databases.

The application of this disclosure, and the many embodiments is adaptable for a plurality of users, all within a single application. The application provides for customer interface on one hand, a real estate agent on the other hand, and yet a third level for real estate managers. Further, the real estate application provisions a safety engine that allows for enhanced tracking of real estate transactions. The applications and engines will be discussed in the following description with regard to the above entities in the same order. In all five categories, the application searches MLS database for residential real estate, which is a starting point for many users. The technology for carrying out the process of this application is described below. Generally, the real estate mobile application has the following features:

1. Compare Homes—Allows for comparing multiple homes at once on one screen with the ability to toggle between multiple comparable options including basic specs, descriptions, pictures (both posted and users), videos (both posted and users), and user notes. Further, the compare homes feature may have a compare home engine and an image engine wherein database files may be associated with metadata or tagged with the corresponding room view.

2. Check-in/out/Tracking/Safety Engine—GPS enabled home check in/out to meet the needs of the buyer, seller, real estate agent (agent), and broker-in-charge (BIC)/office as well as safety features. In an embodiment, a map program leads the user to a home which then allows the showing agent to "check-in".

a. Buyer i. Check in—When the buyer checks-in at the home, this can be done at any time, they are capable of adding additional notes/pictures/videos to their home to further develop necessary information to drive a purchasing decision. This may further be automatically conducted based on at least the buyer's location relative to the property.

ii. Check out—When the buyer checks-out at the home, optionally controlled by the showing agent's check-out, they are prompted to provide feedback through an optionally immediate on screen feedback form unique to the app. 1) It reminds the buyer to update their rating and comments while the showing is fresh on their mind. 2) It helps provide beneficial feedback to the real estate agent AND/OR seller. 3) Prompt the buyer if they need directions to the next scheduled appointment/home.

b. Seller i. Check in—Feature that allows the seller to know when the scheduled showing appointment has begun as it notifies the seller through text/email (their choice) when the buyer/agent check-in. The seller features are controlled by the MLS/listing agent setting up the notifications for check-in, check-out and/or neither.

ii. Check out—Feature that allows the seller to know when the buyer and agent have finished their showing appointment. The seller will receive instant notification through text/email (their choice) when the showing has completed at their listed home after the buyer/agent check-out. This can be GPS enabled through GEO Boundary Technology, but it is optionally controlled by the showing agent manually "checking out" first.

c. Agent—Feature in place to increase schedule visibility with the intention of improved Agent safety and tracking by authorized parties.

i. Check-in—Prompts dashboard on Agent's smart phone that gives them the option to access the home screen, notes/feedback, contact office, call 911, or go to home screen. Check-in also alerts BIC or designated office lead that the Agent has started his/her showing appointment. There is a countdown display that can be optionally displayed on the agent's screen (e.g. the Detail Page, referred to with respect to FIG. 34).

ii. Check-out—When the Agent leaves the home the Agent is prompted to check-out. The purpose of checking-out is to 1) Remind the Agent to obtain feedback from the buyer that they can then submit to seller 2) Alert the seller the showing is complete and the home is vacant 3) Alert the BIC/office that the Agent has completed the scheduled showing 4) Prompt the Agent if they need directions to their next scheduled showing/home. This can be automated by GEO Boundary or by GPS location relative to the showing address. The check-out is part of the safety feature and could optionally require some sort of password or PIN to be entered by the agent. Additionally, this password or PIN could also be used (by being entered) to extend the pre-set time allowed in each home set up in the agent's profile.

d. BIC/Office i. Check-in—Alerts office that the Agent has begun his/her showing and starts a timer. The timer allows the office to track how long the Agent has been at the home with the buyer. The office can adjust the settings on when to contact the Agent if the appointment has extended past the standard period (for instance, if the Agent has not checked out after one hour the office will be notified via email/alert to contact the Agent to ensure everything is ok).

ii. Check-out—Notifies the office that the agent has ended his/her scheduled showing.

Additional embodiments and technical disclosure around the safety engine and the real estate mobile application are found below within the Safety Engine section.

3. Home Linked Communication—One source of communication between the app users and/or Agents separated into different files for each home in conversation. File can contain all previous conversations/pictures/videos/notes/calendar history will also connect with the user's calendar to link scheduled showings/open house to user's calendar. This revolves around photo of home and MLS number (if available.)

4. Feedback—While viewing homes the customer or agent will have a feedback screen appear or be an option on the showing screen. It will automatically ask for feedback (if GPS enabled) when checking out of a home after a showing. The agent will receive all feedback from the customer viewing the home after the buyer/user has completed feedback and checkout (this will be the listing agent if the buyer has not selected an agent). In the case of the buyer having an agent, the feedback will first be received and is editable by the agent and then can be forwarded to the listing agent or designated contact. If there are multiple showings in one day, all feedback can be sent with one button, or each can be viewed/edited and sent one at a time.

5. Communicating Appointments (Showings)—After an appointment(s) is requested which may be done through a link to a designated app source, the agent can confirm appointment(s), which will go to the "Scheduled Appointments" section of the application. Appointments will show up in the order of the scheduled appointment(s) with a time stamp of the slotted time confirmed. This screen also tracks past showings in order of the date and shows that the showing has been completed when both check-out (triggered by the check-out feature above) and feedback has been sent. The appointment will not be completed and/or time-stamped until both of the above are completed. Feedback can be completed by sending it or selecting to decline feedback. If decline, a message is still sent to the listing agent that no feedback will be provided at this time.

6. 3 Star Rating System—Measure of rating on a scale of 3 stars (1 being the lowest, 3 being the highest). This rating system can be updated through the home buying process and dictates the order or ranking of viewed homes as seen on the "Favorites" screen. This rating is visible to the buyer's agent (if he/she has selected an agent) and helps the agent understand the buyer's favorites. The buyer can also move homes up or down by sliding the listing info up or down to give them a preference order with homes of the same 3-star rating. When they select a home to "in the top 3" it will automatically replace the previously ranked $3^{rd}$ home on the favorite page. The rating is visible to the buyer's agent (if selected) and helps the agent understand the buyer's favorites. The agent's customer database is also ranked by 3 stars, in an embodiment. A 3-star buyer, for example, could be one that is actively/presently looking for a home.

I. Exemplary Technology

Certain aspects of the technology for carrying out the process of the current application is illustrated in FIGS. 1 through 3B. The technology for the mobile application provides a database for a web server, which is in communication through a social networking technology with the mobile application as illustrated in FIG. 1.

Figure 2:
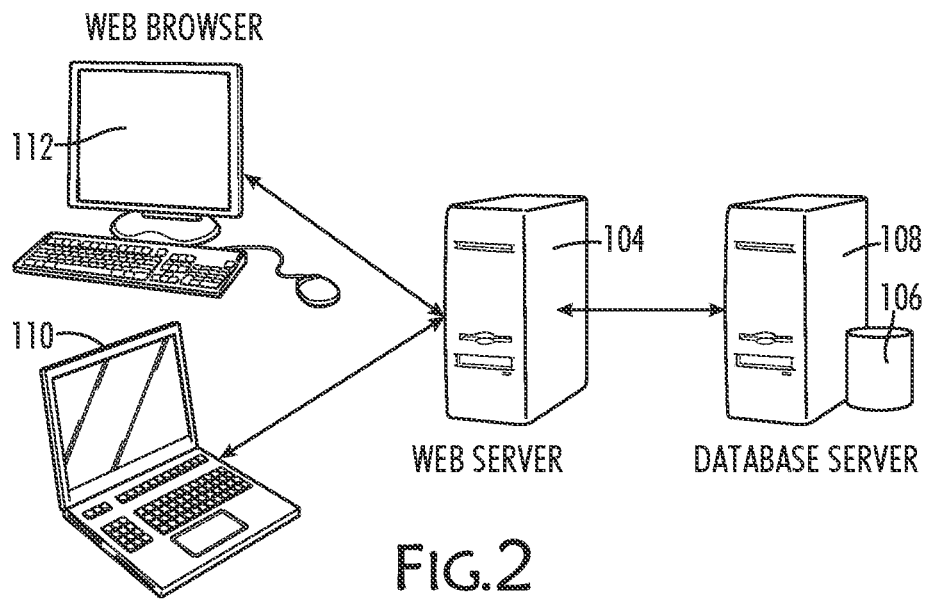
FIG. 2 is similar to FIG. 1, with web browsers executing on a laptop computer and a desktop computer.
Figure 3:
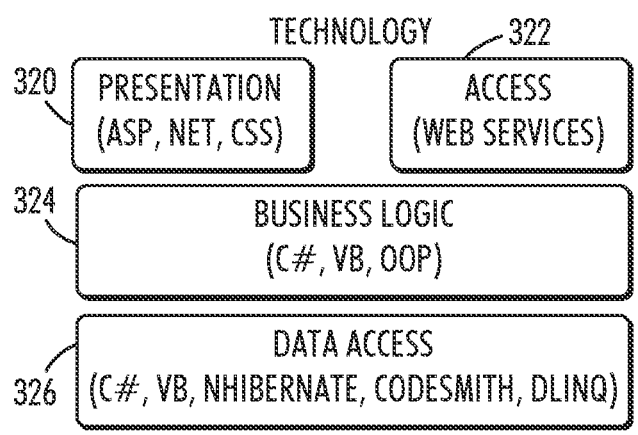
FIG. 3 is a block diagram showing logic layers executing on the web server of FIG. 1 to facilitate the operation of the social network.

More particularly, as illustrated in FIG. 1, as an essential element of the claimed invention a networked mobile wireless telecommunication computing device, shown for illustrative purposes as a smartphone 102, communicates, e.g. via the Internet, with a web server 104 which in turn communicates with one or more databases 106 to implement the operation of a social network. The database 106 may be hosted on the web server 104, i.e. the database server and the web server may be hosted on a common computer system, or on a different computer system (e.g. a separate database server 108 as shown in FIG. 3) with communication therebetween being by way of a local area network, wide area network or the Internet, for example. In the illustrated embodiment the smartphone 102 executes the mobile application as a web application (i.e. an HTML program executing in a web browser) which sends service requests to the web server 104 using the SOAP protocol and receives responses from the web server 104 in XML (eXtended Markup Language) format for display in the web browser. Native implementations of the mobile application (e.g. for the iOS or Android operating systems) are also contemplated. FIG. 2 illustrates an arrangement similar to that shown in FIG. 1, implementing website communication with similar technology including a database server 108 implementing the database 106 and a web server 104 in communication with web browsers executing on a laptop computer 110 and a desktop computer 112.

FIG. 2 is a block diagram showing logic layers executing on the web server 104 to facilitate the operation of the social network. The logic layers include a presentation layer 320, an access layer 322, a business logic layer 324 and a data access layer 326. The access layer 322 receives web service requests (e.g. SOAP protocol requests from the smartphone 102) and passes them to the business logic layer 324 after suitable processing. The business logic layer 324 then executes on the request, typically communicating with the data access layer 326 to retrieve data from and/or store data in the database(s) 106. The business logic layer 324 can be implemented in any suitable language(s), including C Sharp (C #), Visual Basic or another suitable programming language (e.g. an object oriented programming (OOP) language). The data access layer 326 may be implemented in any suitable language(s), including C Sharp (C #), Visual Basic or another suitable programming language, or may implement tools such as NHibernate, CodeSmith, or Dlinq, for example. The presentation layer 320 presents the results from execution of the business logic layer 324, and may implement ASP (Active Server Pages), the .NET Framework, and/or Cascading Style Sheets (CSS), for example.

The present invention may be embodied within a system, a method, a computer program product or any combination thereof. The computer program product may include a computer readable storage medium or media having computer readable program instructions thereon for causing a processor to carry out aspects of the present technology. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

It will be understood that the present invention can be implemented by computer readable program instructions. Computer readable program instructions described herein can be downloaded to respective computing/processing devices from a computer readable storage medium or to an external computer or external storage device via a network. Computer readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language or a conventional procedural programming language. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present technology.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing aspects of the mobile application described herein. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the mobile application described herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement aspects of the mobile application described herein.

Figure 3A:
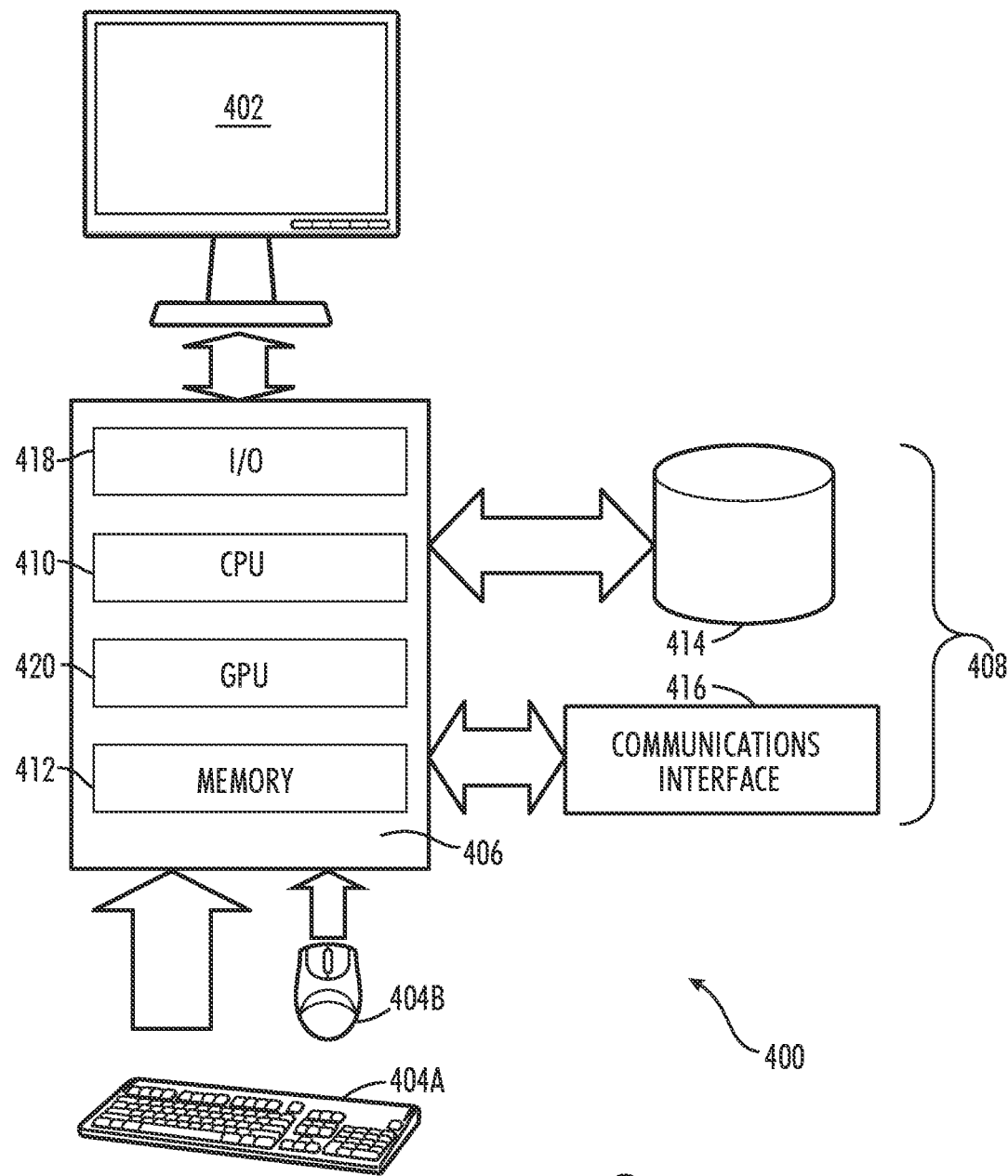
FIG. 3A is a block diagram showing an exemplary computer system in respect of which aspects of the present technology may be implemented.

An illustrative computer system in respect of which aspects of the technology herein described may be implemented is presented as a block diagram in FIG. 3A. The illustrative computer system is denoted generally by reference numeral 400 and includes a display 402, input devices in the form of keyboard 404A and pointing device 404B, computer 406 and external devices 408. While pointing device 404B is depicted as a mouse, it will be appreciated that other types of pointing device, or a touch screen, may also be used.

Figure 4:
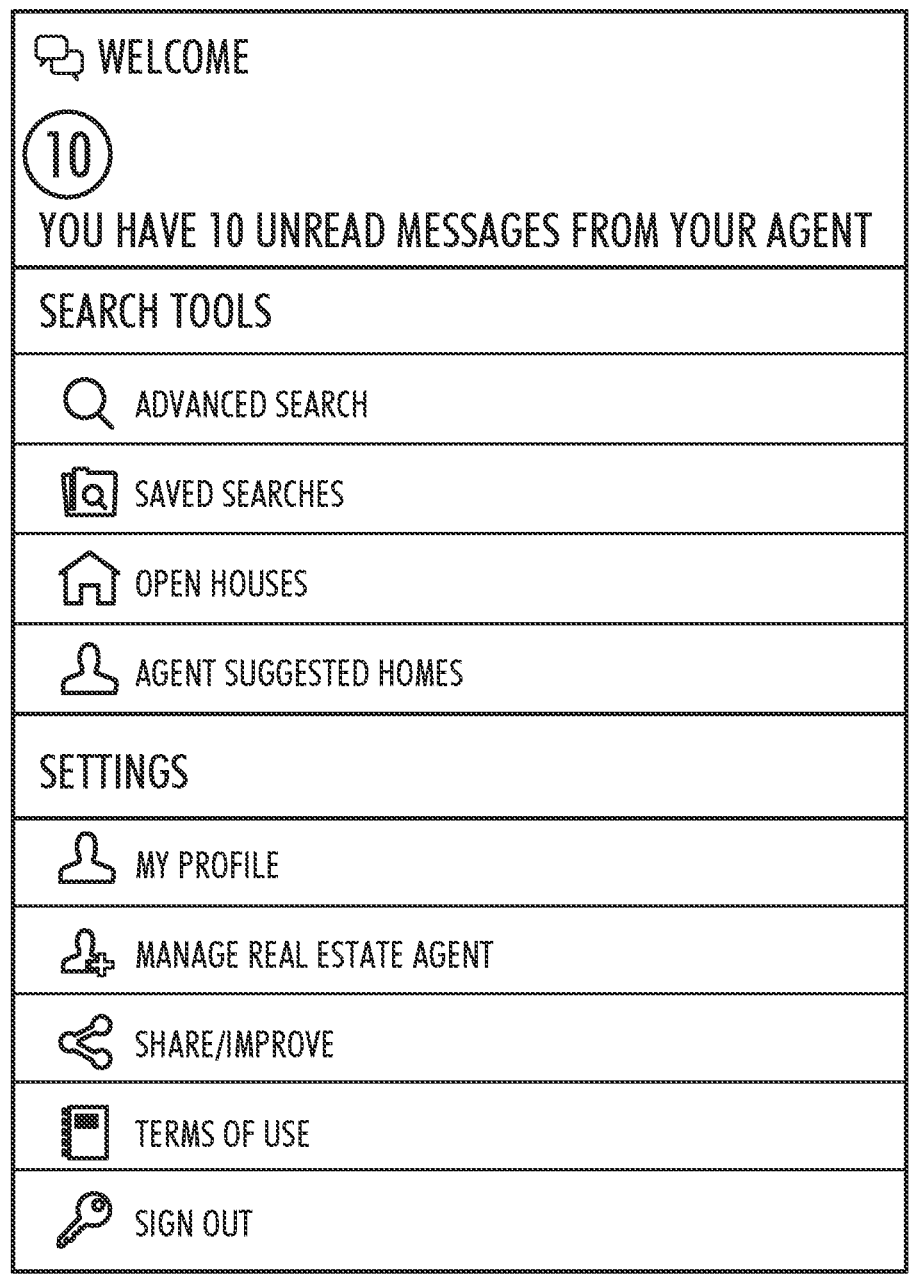

The computer 406 may contain one or more processors or microprocessors, such as a central processing unit (CPU) 410. The CPU 410 performs arithmetic calculations and control functions to execute software stored in an internal memory 412, preferably random access memory (RAM) and/or read only memory (ROM), and possibly additional memory 414. The additional memory 414 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 414 may be physically internal to the computer 406, or external as shown in FIG. 4, or both.

The computer system 400 may also include other similar means for allowing computer programs or other instructions to be loaded. Such means can include, for example, a communications interface 416 which allows software and data to be transferred between the computer system 400 and external systems and networks. Examples of communications interface 416 can include a modem, a network interface such as an Ethernet card, a wireless communication interface, or a serial or parallel communications port. Software and data transferred via communications interface 416 are in the form of signals which can be electronic, acoustic, electromagnetic, optical or other signals capable of being received by communications interface 416. Multiple interfaces, of course, can be provided on a single computer system 400.

Input and output to and from the computer 406 is administered by the input/output (I/O) interface 418. This I/O interface 418 administers control of the display 402, keyboard 404A, external devices 408 and other such components of the computer system 400. The computer 406 also includes a graphical processing unit (GPU) 420. The latter may also be used for computational purposes as an adjunct to, or instead of, the (CPU) 410, for mathematical calculations. The various components of the computer system 400 are coupled to one another either directly or by coupling to suitable buses.

Figure 3B:
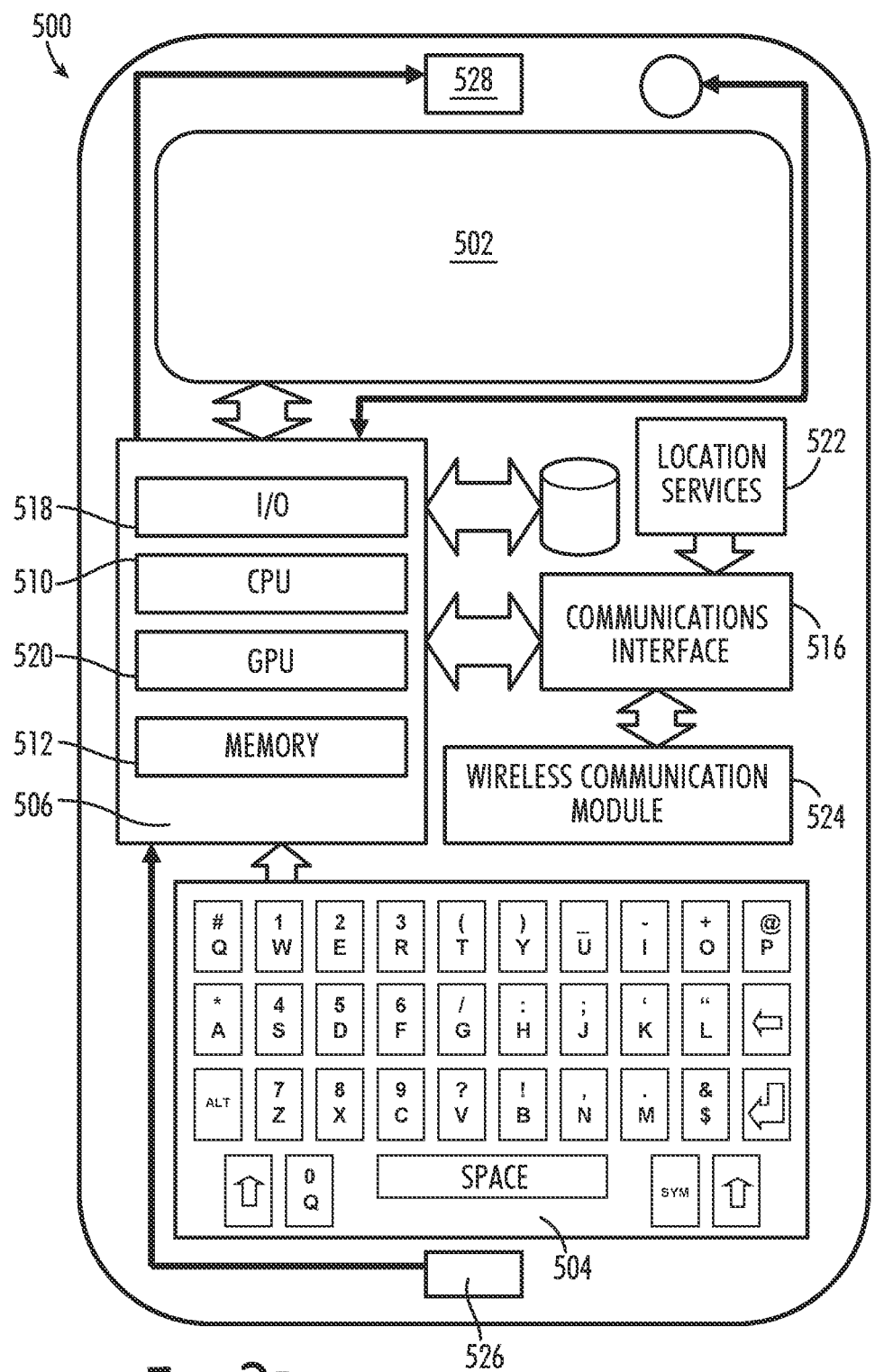
FIG. 3B is a block diagram showing an exemplary smartphone in respect of which aspects of the present technology may be implemented.

FIG. 3B shows an exemplary networked mobile wireless telecommunication computing device, in the form of a smartphone 500, in respect of which aspects of the technology herein described may be implemented. The smartphone 500 includes a display 502, an input device in the form of keyboard 504 and an onboard computer system 506. The display 502 may be a touchscreen display and thereby serve as an additional input device, or as an alternative to the keyboard 504. The onboard computer system 506 comprises a central processing unit (CPU) 510 having one or more processors or microprocessors for performing arithmetic calculations and control functions to execute software stored in an internal memory 512, preferably random access memory (RAM) and/or read only memory (ROM) is coupled to additional memory 514 which will typically comprise flash memory, which may be integrated into the smartphone 500 or may comprise a removable flash card, or both. The smartphone 500 also includes a communications interface 516 which allows software and data to be transferred between the smartphone 500 and external systems and networks. The communications interface 516 is coupled to one or more wireless communication modules 524, which will typically comprise a wireless radio for connecting to one or more of a cellular network, a wireless digital network or a Wi-Fi network. The communications interface 516 will also typically enable a wired connection of the smartphone 500 to an external computer system. A microphone 526 and speaker 528 are coupled to the onboard computer system 506 to support the telephone functions managed by the onboard computer system 506, and a location services module 522 (e.g. including GPS receiver hardware) may also be coupled to the communications interface 516 to support navigation operations by the onboard computer system 506. One or more cameras 530 (e.g. front-facing and/or rear facing cameras) may also be coupled to the onboard computer system 506. The camera(s) 530 may be used to capture an image of a home or a portion of an interior of a home (e.g. a room), and/or an image of a customer and/or an image of an agent, for further handling according to the present disclosure. Input and output to and from the onboard computer system 506 is administered by the input/output (I/O) interface 518, which administers control of the display 502, keyboard 504, microphone 526, speaker 528 and camera 530. The onboard computer system 506 may also include a separate graphical processing unit (GPU) 520. The various components are coupled to one another either directly or by coupling to suitable buses.

The terms "computer system", "data processing system" and related terms, as used herein, are not limited to any particular type of computer system and encompasses servers, desktop computers, laptop computers, networked mobile wireless telecommunication computing devices such as smartphones, tablet computers, as well as other types of computer systems.

Thus, computer readable program code for implementing aspects of the technology described herein may be contained or stored in the memory 512 of the onboard computer system 506 of the smartphone 500 or the memory 412 of the computer 406, or on a computer usable or computer readable medium external to the onboard computer system 506 of the smartphone 500 or the computer 406, or on any combination thereof.

Operation of an exemplary implementation of the mobile application will now be described.

Exemplary and Non-limiting Definitions:

1. Customers are people who are searching for a home within a geographical area. They can search by street, city, zip code, or schools. The client has the entire suite of tools necessary for managing the searching and buying process of their new home from start to finish.
2. Real estate agents are the sellers and buyer's agent for the customers. The agent can manage all their clients, schedule appointments, chat with clients, and more within the application.
3. Real estate managers are the people responsible for overseeing agents. The application allows them to view agents checking in and check out status, receive emergency alerts and more.

II. Customer Version

The customer version is designed specifically for the end user (customer). The main focus is to give the customer one place to search, communicate with their agent, compare, rank, organize and give feedback on homes.

The home screen is the main landing page of the mobile application. Customers can access the general features by clicking on the various icons.

The application is unique in that it has a section "My Files." The customer application is a set of features that are related to a specific home that the customer has selected from the search results. Think of this as a filing cabinet with the following built-in features and icons:
My notes
My photos
My videos
My recordings
My showings
Agent Chat/messaging This feature allows the customer to build its own virtual file on the home(s) they are searching. These features are specific to a single home. Each home has its own file/section.

The customer version can be accessed from a website and or downloaded from iTunes or Google Market Place to the customer's mobile device (phone or tablet).

The simple search features search the MLS database based on the customer's search criteria. The simple search feature is located at the top of the application on all pages throughout the app.
The search can be based on one or more of the following:
City and State
School
Zip Code The application searches the MLS database based on the customer's search criteria. The customer can then save the search criteria for later use. Once the user finds the home, they can add to favorites or start using these features. The following is a list of features found in the left slide out menu (or "My Quitchet" menu, specific to the Quitchet™ app), also illustrated in FIG. 4.
Features:
i. Search Tools:
    Advanced search
    Saved searches
    Open houses
    Agent suggested homes
ii. Settings:
    My Profile
    Manage real estate
    Favorite homes
    Schedule showing
    Share Quitchet/Improve Quitchet
    Terms of Use
    Sign out When the user selects "Advanced Search" from the left menu, the screen illustrated in FIG. 5 will appear in the body of the application. The customer can click "Save & Search" (this will save the search criteria to the customers Saved searches or they can simply click "Search."
Features:
Home for sale
Homes under contract
Homes recently sold
By price
Number of beds
Number of baths
Home type
Key words (features)

Figure 6:
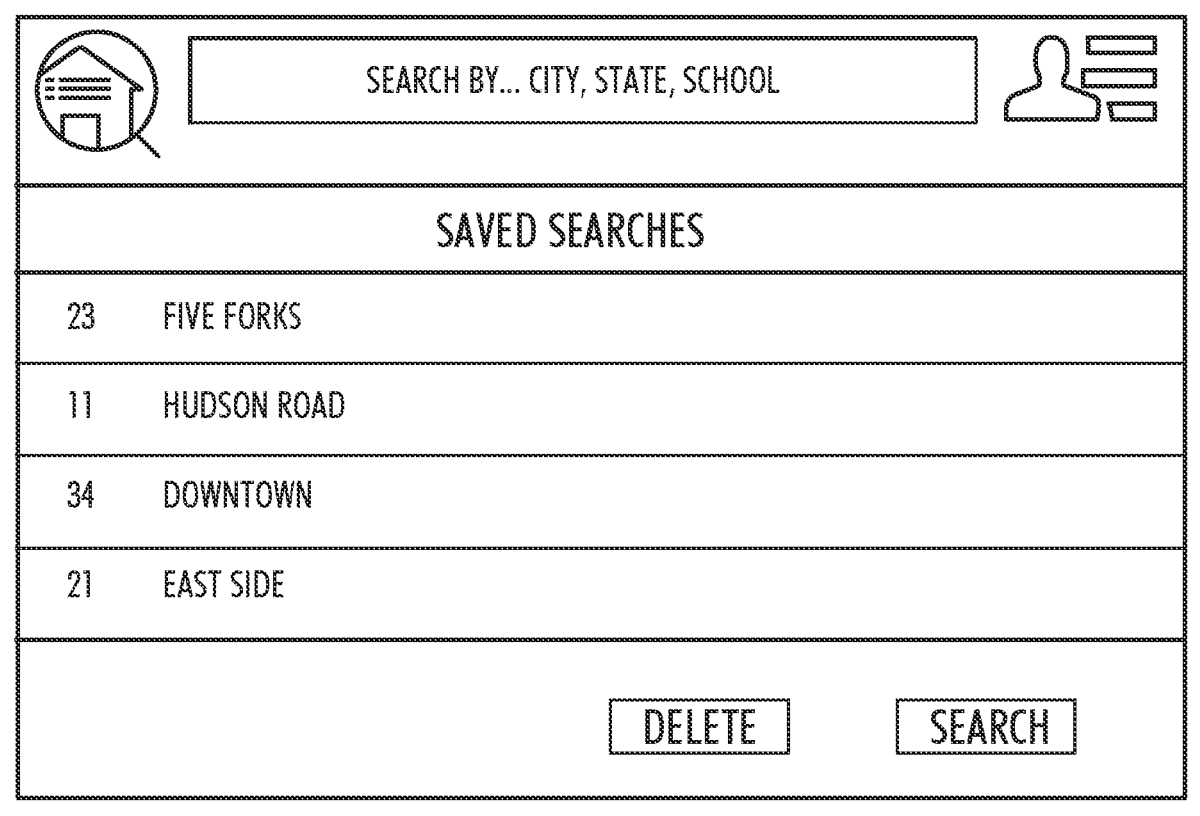
Figure 7:
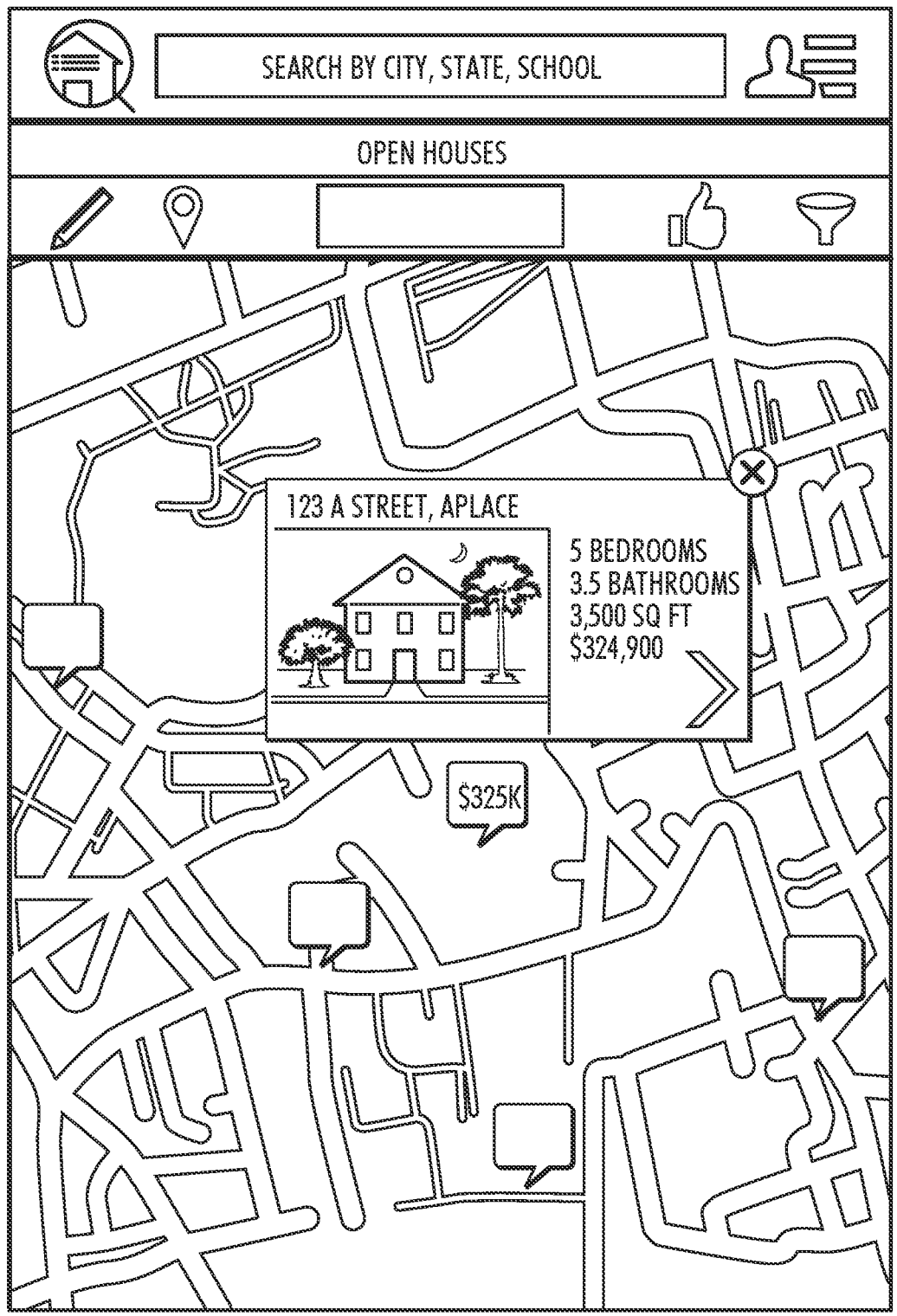
Figure 8:
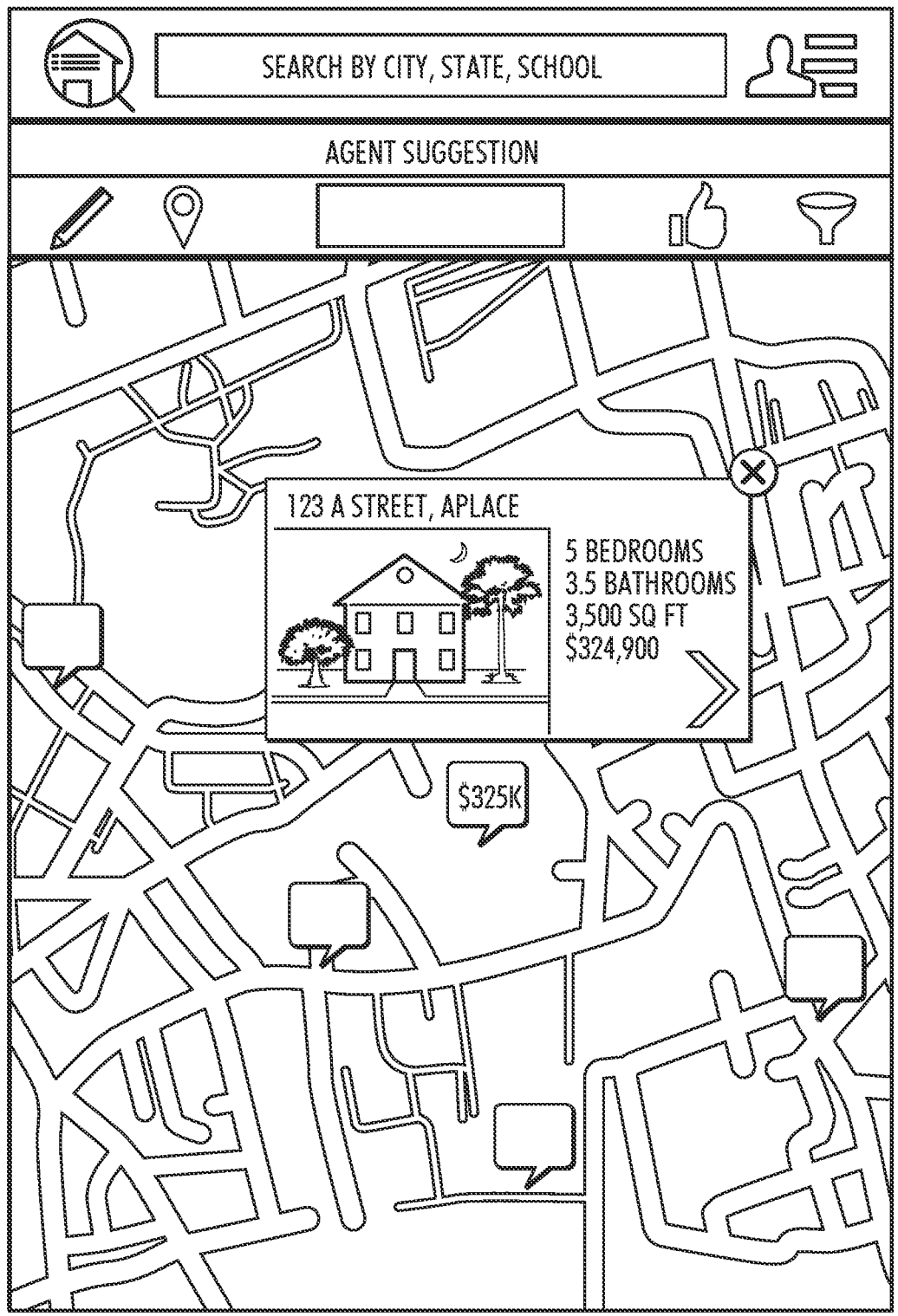
Figure 9:
Figure 10:
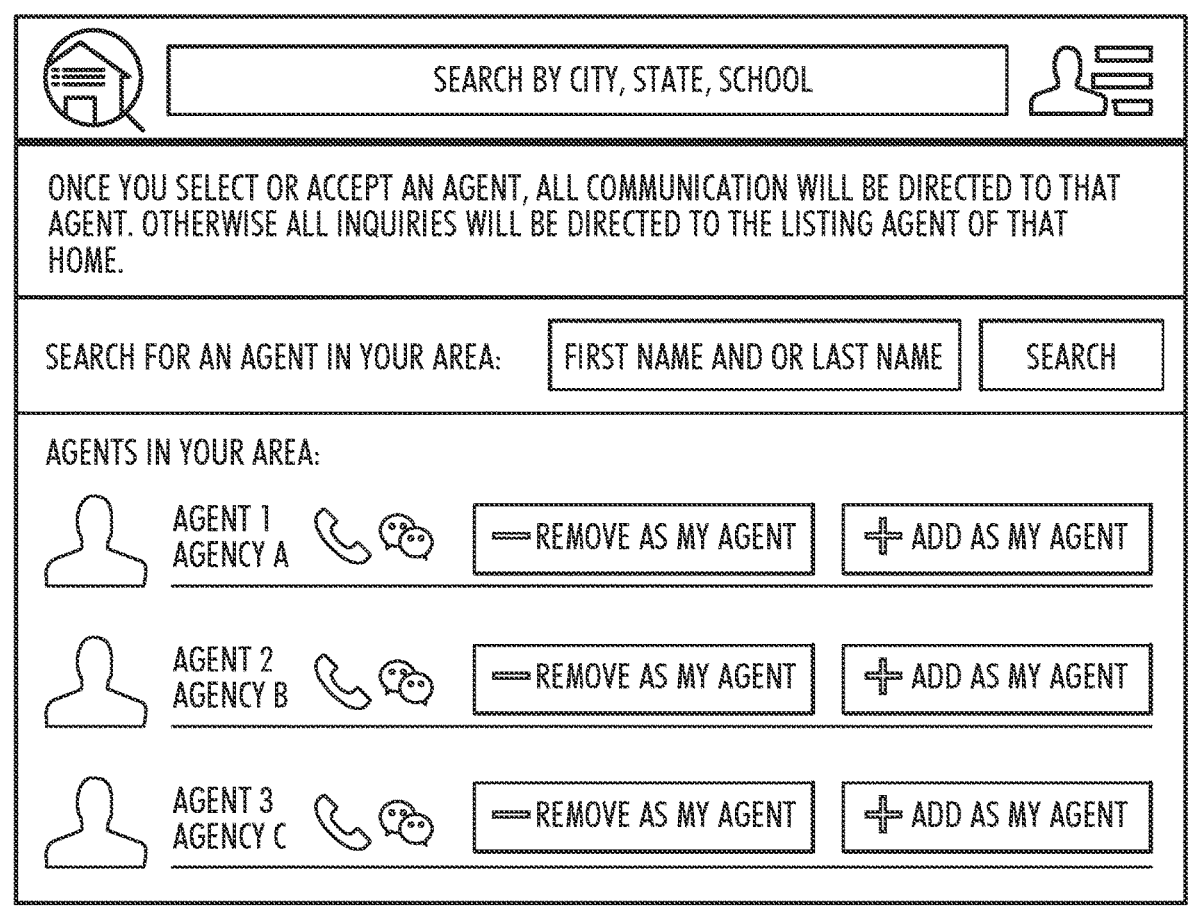

When the user selects "saved searches" from the left menu, the screen of FIG. 6 will appear in the body of the application. The customer can select the previously saved search from the list.
Features:
Displays number of homes in that search criteria
Lists the saved search title
Delete selected saved searches When the user selects "Open Houses" from the left menu, the screen of FIG. 7 will appear in the body of the application. The customer can select one of the Home icons to reveal the details of the home. The customer can search a specific area for Open Houses or they will show the ones in the saved search area(s). The customer can select "open houses" to create a saved "tour" and the app will map them to each home and open files on each home via GPS enabling or manually.
Features:
Address
Main photo
Beds
Baths
Square footage
Price
More Link (right arrow)
Directions When the user selects "Agent Suggested Homes" from FIG. 8 menu, the screen to the right will appear in the body of the application. The customer can view all the homes their agent has suggested for them to review (map view or list view.)
Features:
Address
Main photo
Beds
Baths
Square footage
Price
More Link (right arrow)
Directions When the user selects "My Profile" from the left menu, the screen of FIG. 9 will appear in the body of the application. The customer can edit their basic information.
Features:
First name
Last name
Email
Password When the user selects "Manage real estate agent" from the left menu, the screen of FIG. 10 will appear in the body of the application. The customer can search for local agents, they can:
Features:
Call
Text
Remove agent
Add agent When a customer selects an agent as "My Agent" all other agent's names and information will be hidden until or unless the customer removes that agent designated as their agent.

Figure 11:
Figure 12:
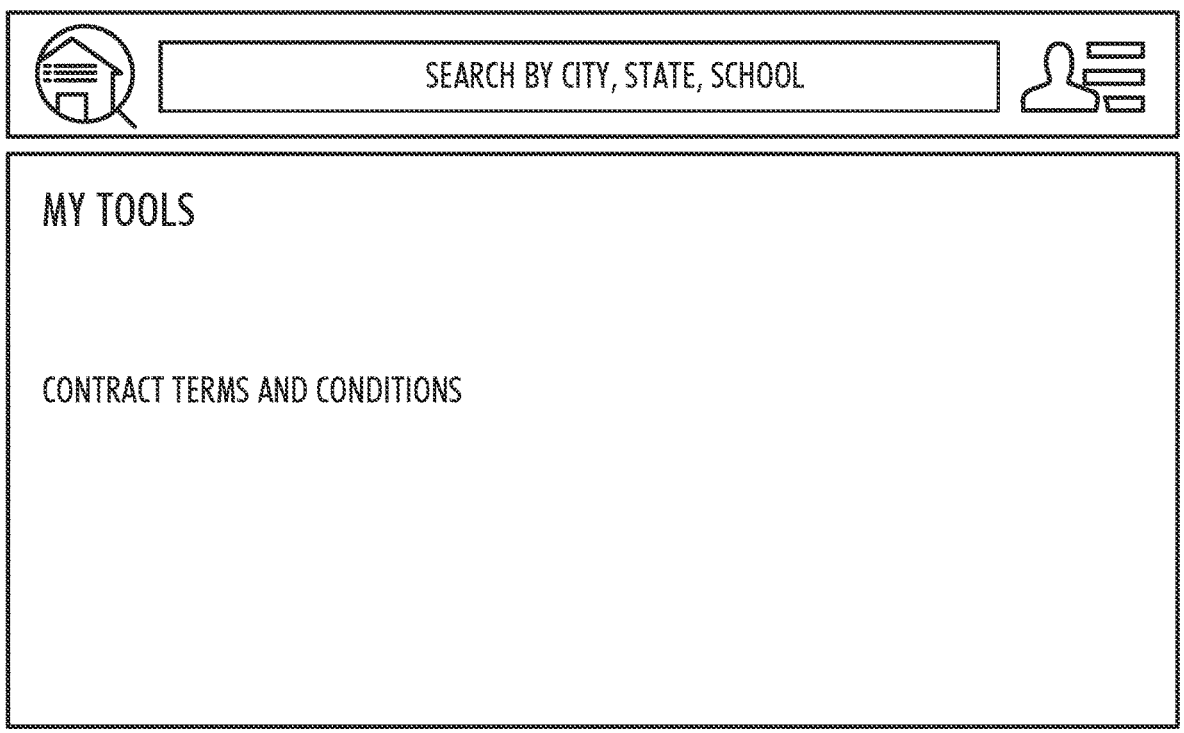

When the user selects "Share" from the left menu, the screen of FIG. 11 will appear in the body of the application. The customer can help us improve the app by leaving us some feedback. They can also share the app with others.

Features:
Improve the app
Facebook
Twitter
Text message
Email

When the user selects "Terms of use" from the left menu, the screen to the right will appear in the body of the application. The customer can read the corporate Terms of Use for the mobile app.

Figure 13:
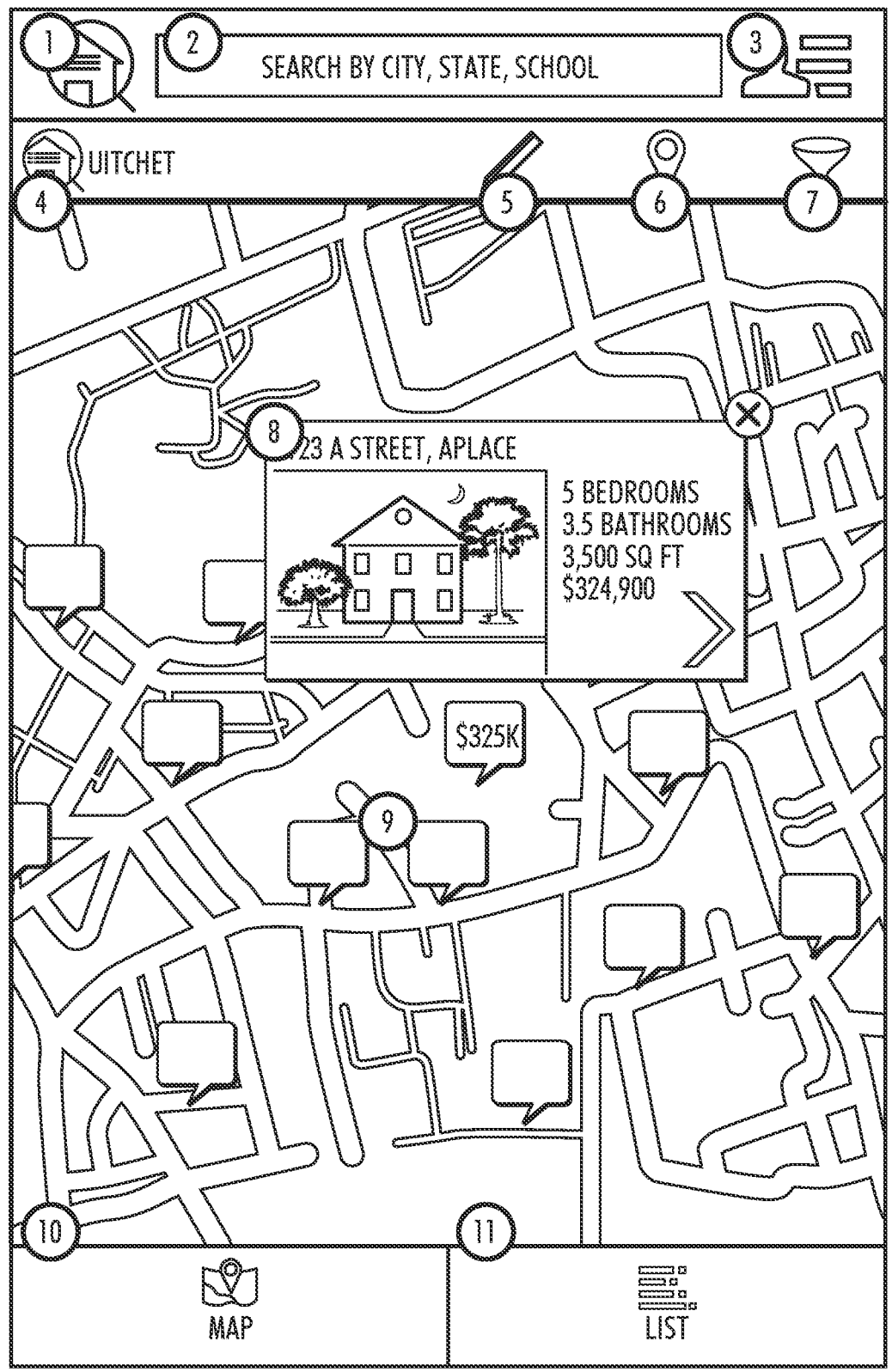

Referring to FIG. 13, the main page of the app is the Map page. This page is having many features for the customer.

Features by reference number:
1. Left icon: By reference number, link to left menu features, search and settings.
2. Quick Search: type in city, state, or school.
3. Right icon: Link to right menu features in My tools.
4. Logo: Link back to main map page.
5. Draw icon: Draw on app the area searches boundaries.
5. Map icon: Searches homes based on customer current location/GPS location.
6. Search icon: Filter homes by for sale, under contract, recently sold, price, beds and baths.
7. Home pop up window: shows basic information about home selected.
8. Map icons: Color coded map icons showing location of homes.
10. Map button: Takes user back to home page (this page).
11. List button: Shows the homes based on the search criteria in a list view.

Figure 14:
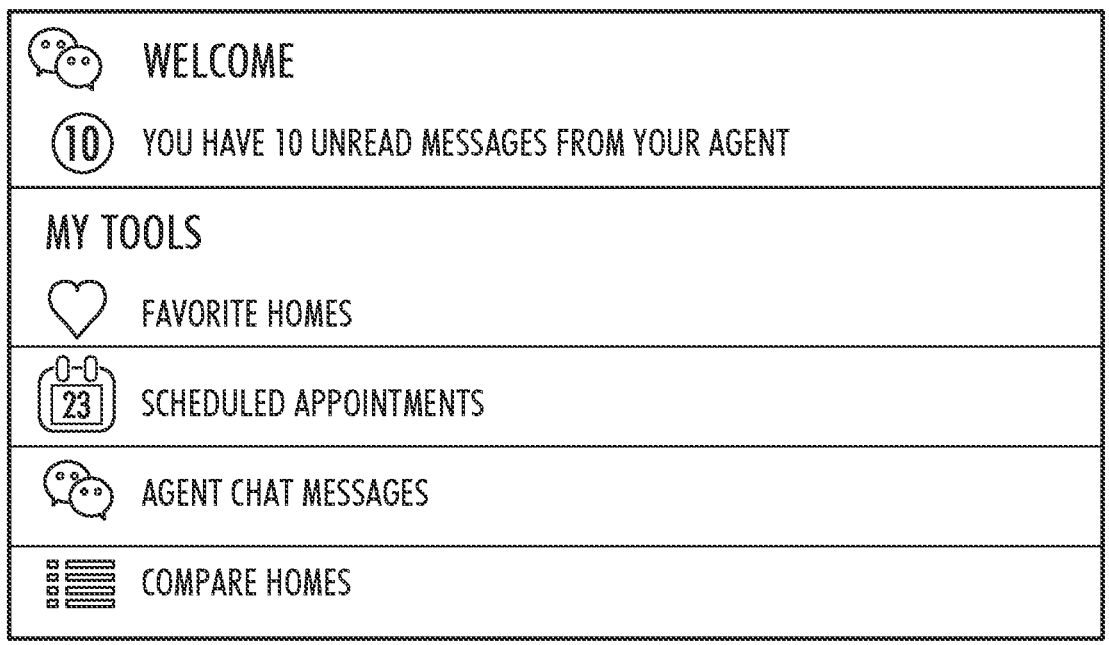

The app has a set of tools designed specifically for the customer. The tools are located on the right slide out menu illustrated in FIG. 14. The following is a list of features found in the right slide out menu.

Features:
Favorite homes
Scheduled appointments
Agent chat messages
Compare homes The app allows the customer to take any home found in their search results and add/remove them to a "Favorite homes" list. The following is a list of features found in the once a home has been added to the Favorite homes section.

Features:
Images (scroll left and right)
MLS details (scroll up and down)
Remove home from Favorites
Share home with agent
Compare home against other favorite homes
Listed by star rating.

The application allows the customer to request a showing (if they have an agent the request goes to their agent, or if not, the request always goes to the listing/sellers agent). The agent will be notified, once the agent sets the date and time for the showing it will notify the customer and display in Scheduled showings. Once accepted this will populate the customer and agent's calendar.

Figure 15:
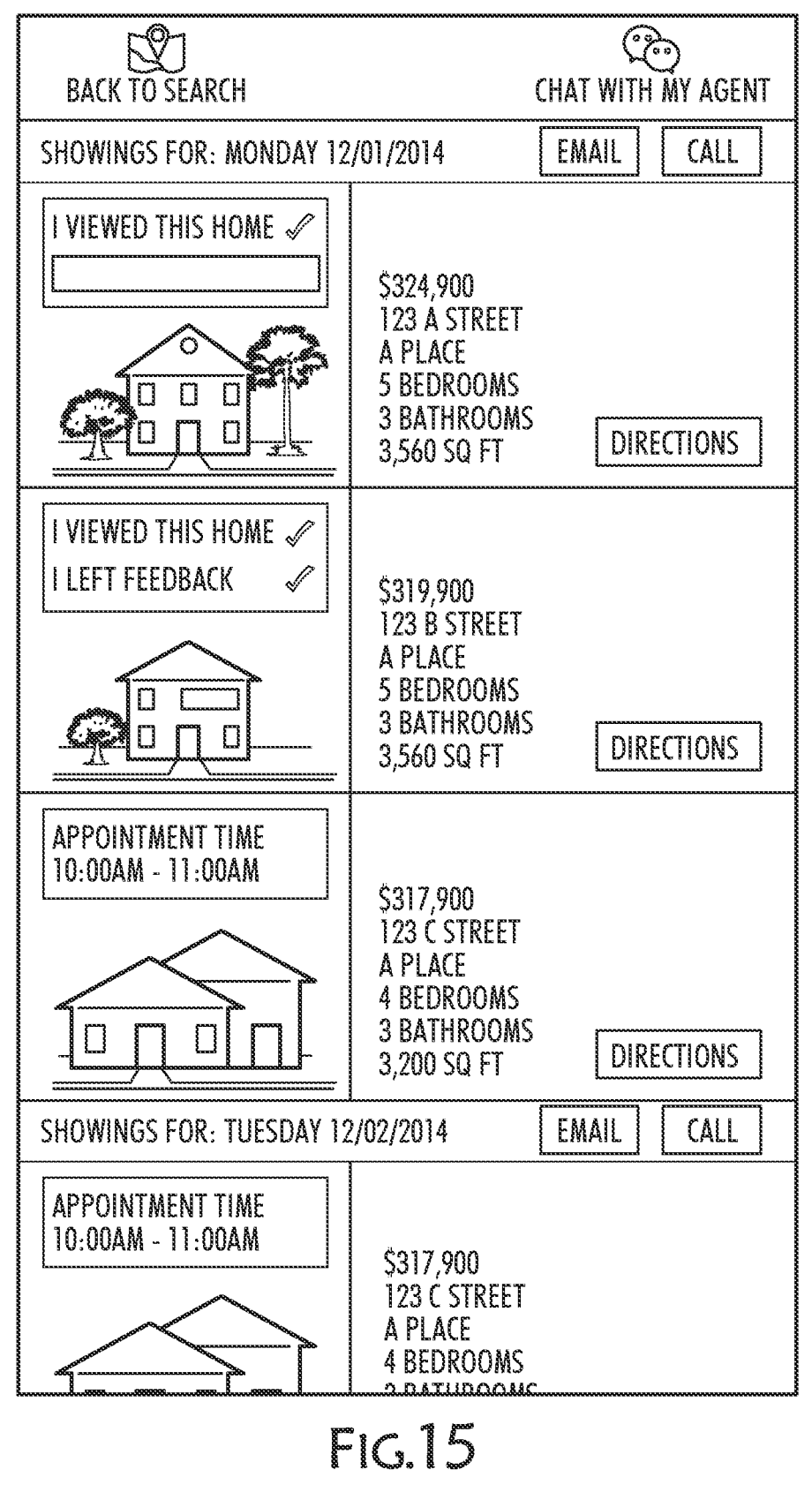

Features as illustrated in FIG. 15:
Back to search
Chat with agent
Directions to the home
Listed showings by date and time
List of past showings
"I viewed the home"
"I left feedback"

The application allows the customer and the associated agent to chat (within the app) around each home. This ensures that all conversation (chats) are grouped and stored within the appropriate home. The Agent chat messages is a list of all the homes that have a chat session. The customer can select the home and review/start or continue a chat dialog. The most recent is always at the top and unanswered chat on each home will be indicated by a bubble icon.

Figure 16:
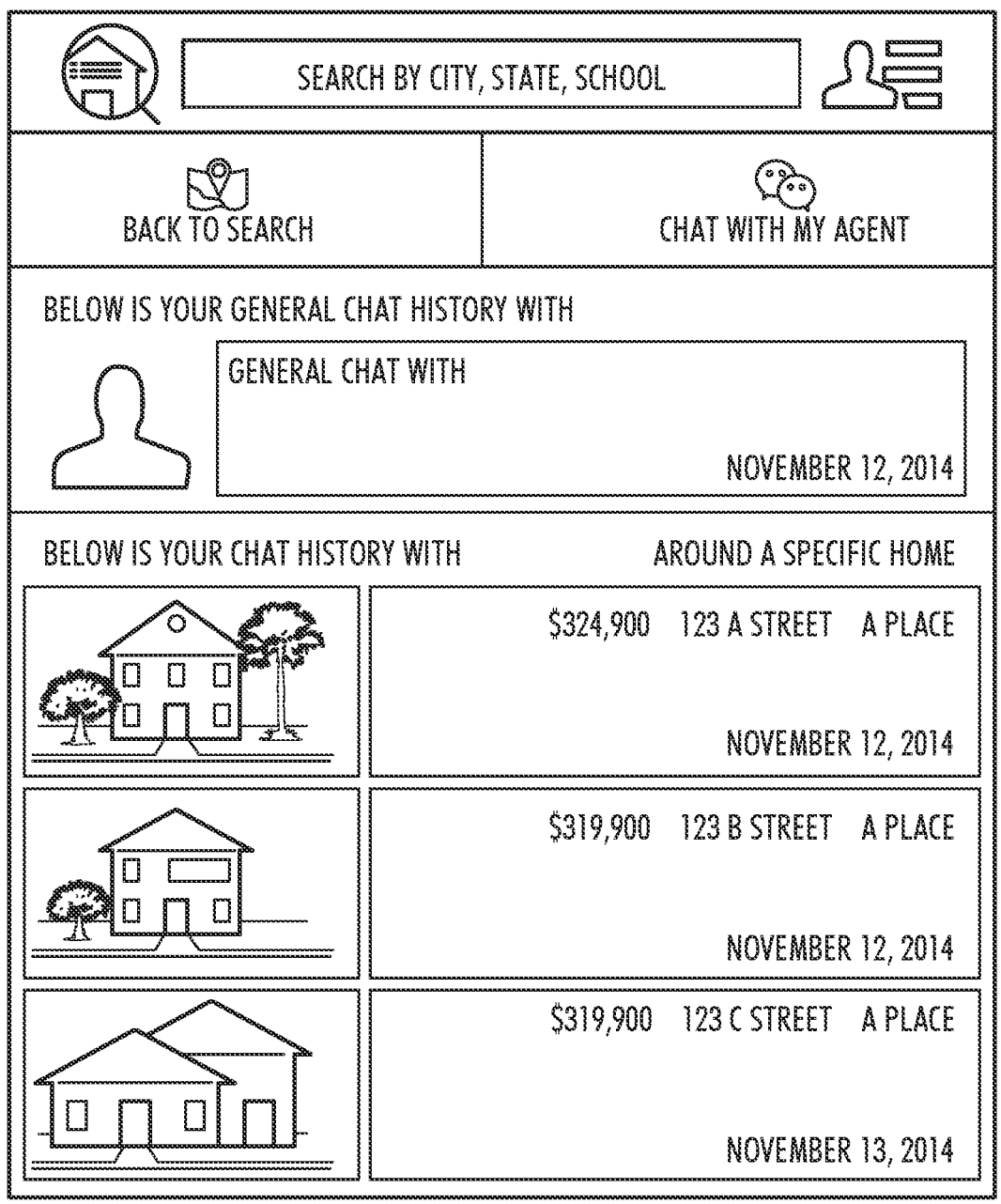

Features (FIG. 16):
Back to search
Chat with agent
List of homes with chat session
Separated by general chat with agent and by homes Once the customer selects a home that has a chat history (see above Agent chat message) they are taken to the actual chat message history.

Figure 17:
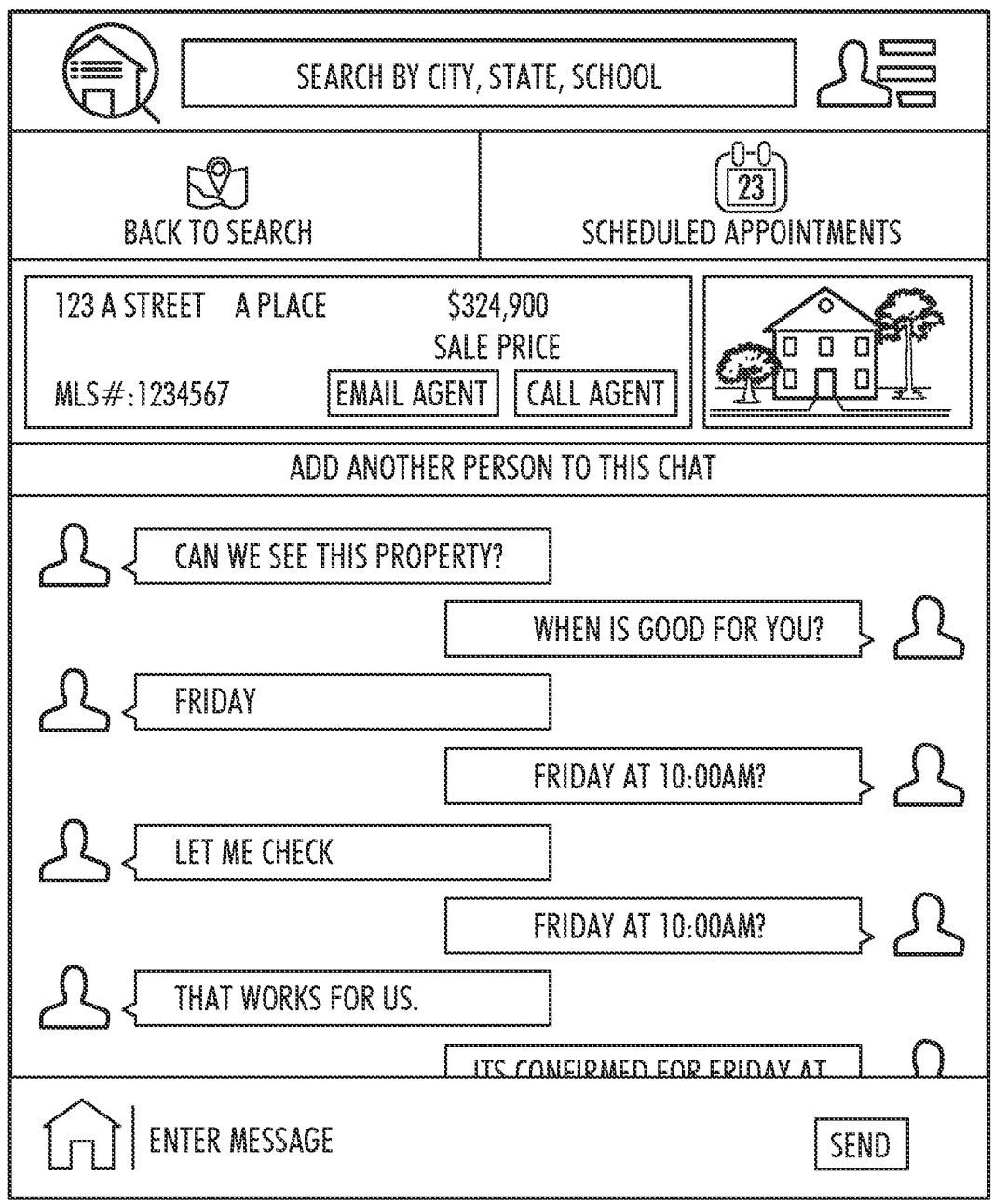

Features (FIG. 17):
Back to search
Schedule a showing
My Files
Add to favorites
Display house details
Email agent
Call agent
Picture of customer and agent
Enter message
Link to Map/Home The Compare Homes feature allows the customer to select as many homes as they desire from the "Favorite Homes" list. Once the homes are selected and then added to the "Compare Homes" page, the customer can compare all the details side by side with each home.

Figure 18:
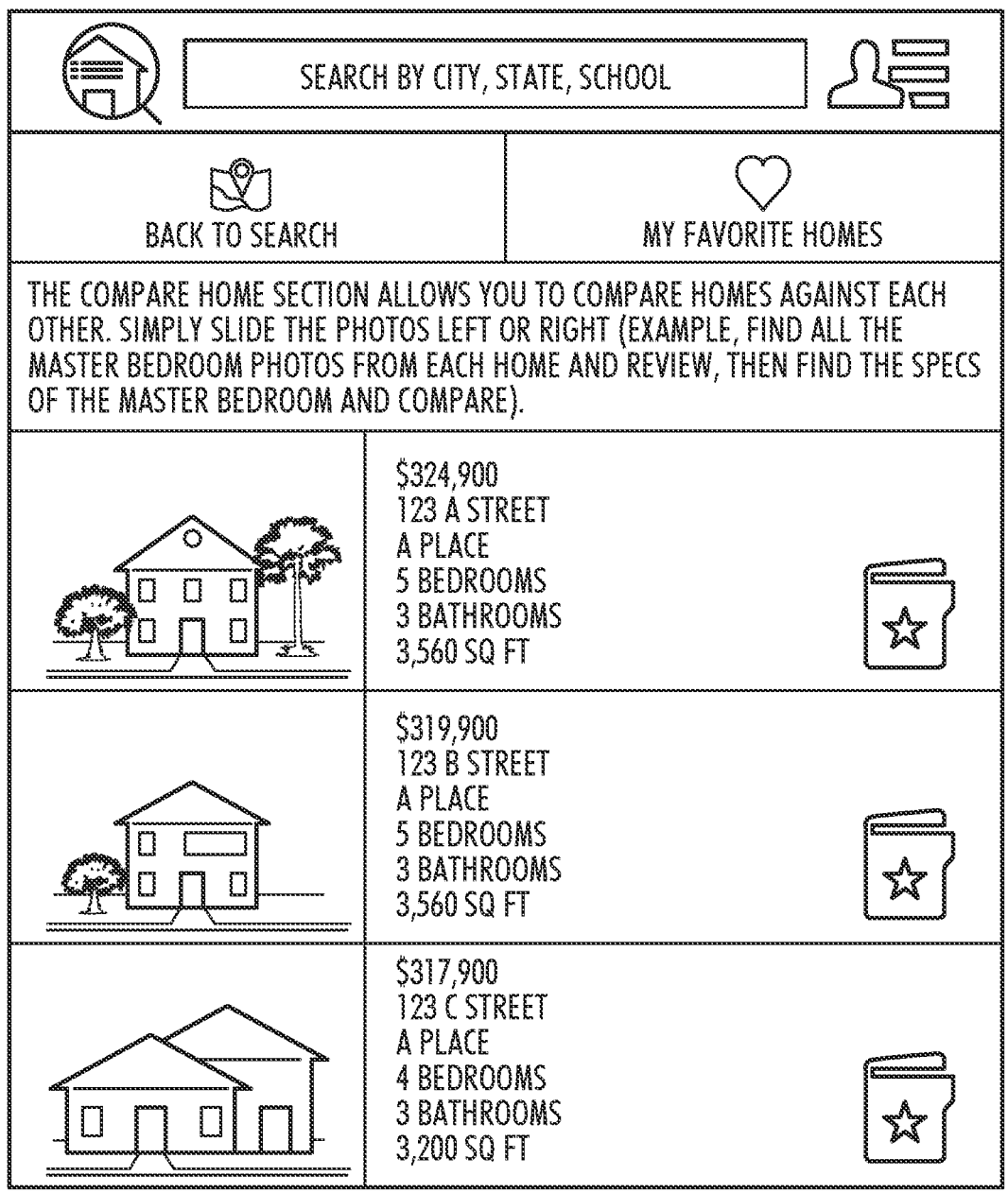

Features (FIG. 18):
Back to search
My favorite homes
Images (slide left and right)
MLS details (slide up and down)
My Files (access all personal images, notes, video, audio, scheduled showing and chat messages).

The Closer Look—Compare Homes feature allows the customer to access all the apps that makeup My Files.

Figure 19:
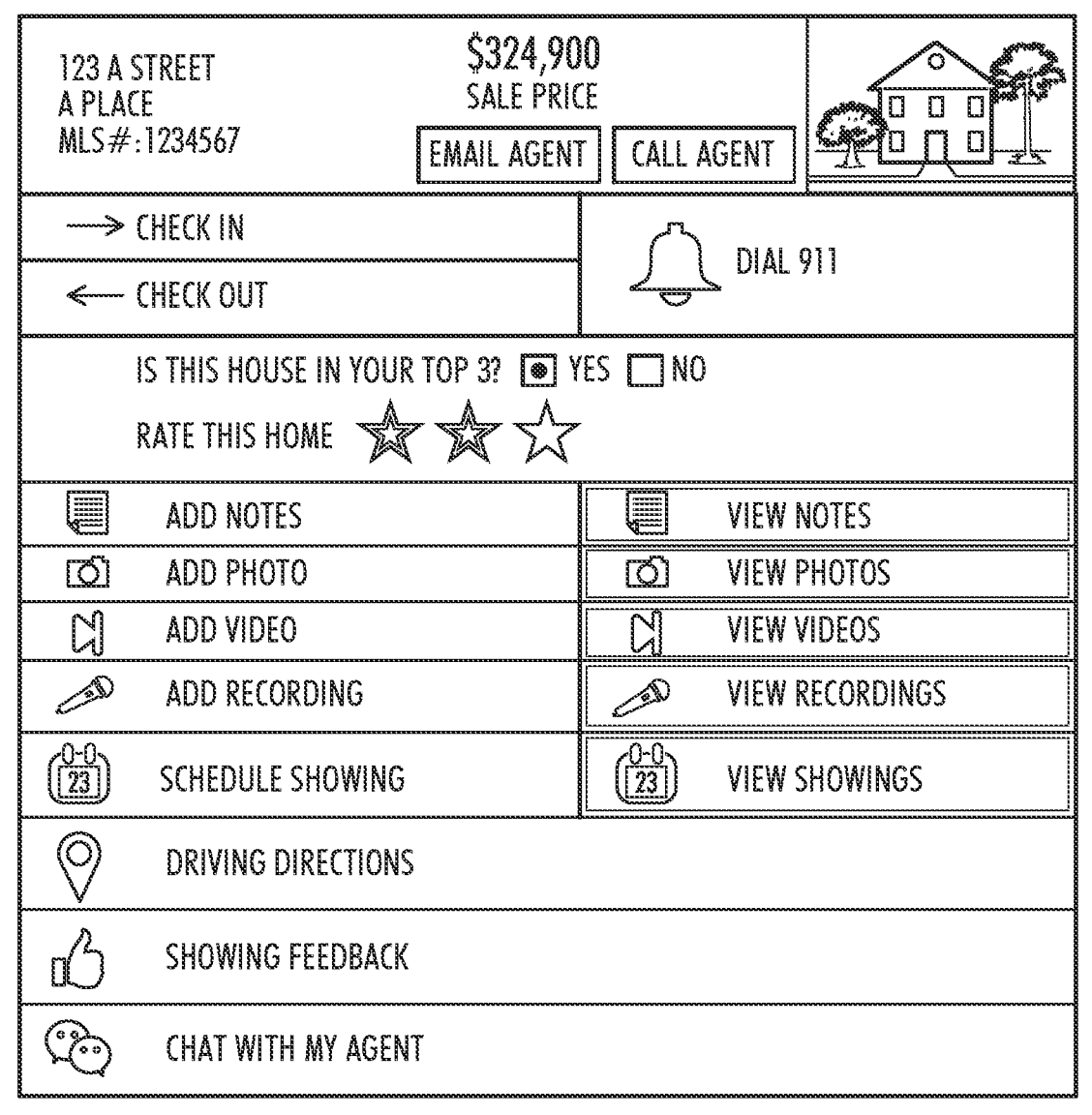

Features (FIG. 19):
Back to search
Home details
Email agent
Call agent
Add/edit notes
Add/edit photos
Add/edit video
Add/edit voice recording
Request showing
Driving directions
Chat with agent
Top 3
Rate this home (3 star)

The Closer Look—Home Details is the main page of all homes in the system. When selected the customer can see all of the MLS details.

Features:
Back to search
Chat with agent

Schedule showing
My Files
Add to Favorites
MLS details
Directions
Email agent
Call agent The Closer Look—Showing Feedback feature allows the customer to send feedback on the home (after they have visited) back to their showing agent. If they don't have a selected agent it will go directly to the listing agent.

Features (FIG. 20):
Speech or text general comment
Type general comments
Sent to agent via email
Auto updated on Scheduled showing that Feedback was left.

The agent version is designed specifically for the professional agent. The main focus is to give the agent one place to search, communicate with their customers, compare, rank, organize and give feedback on homes. The agent version has all of the features of the customer version but has additional features as described below.

The agent status is the main landing page of the agent version mobile application. The agent has several options once they log in.

Figure 21:
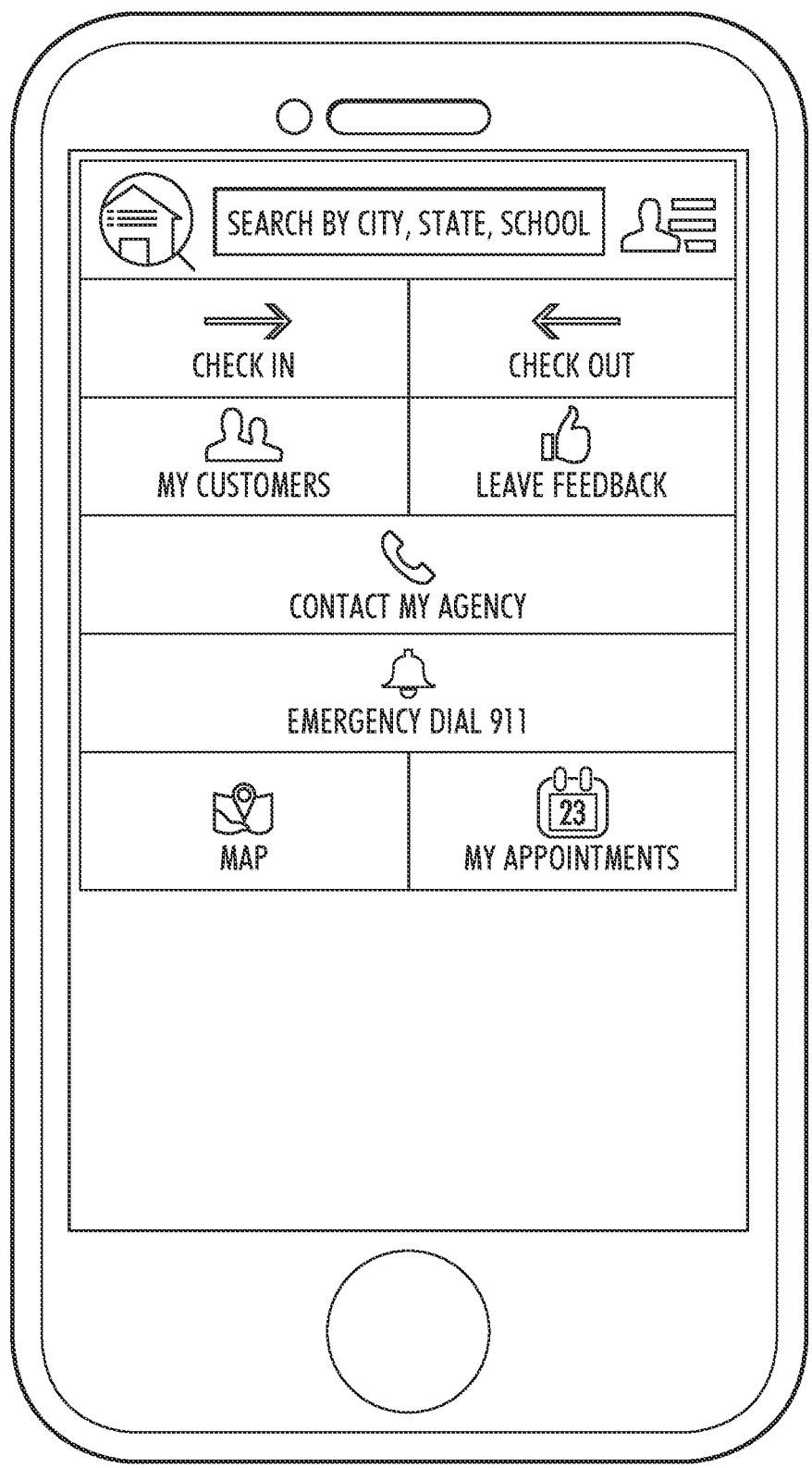

Features (FIG. 21):
Check in to the property
Check out of the property
My customer
Leave feedback
Contact my agency
Dial 911

The agent version can be accessed from a website and or downloaded from iTunes or Google Market Place to the customer mobile device (phone or table).

Agents have access to the customers they are connected with and users who are requesting to be customers. Agents can click the "Favorite homes" next to their customer and access the customers' options. This feature connects the agent and the customer with each and every home added to favorites by the customer.

Figure 22:
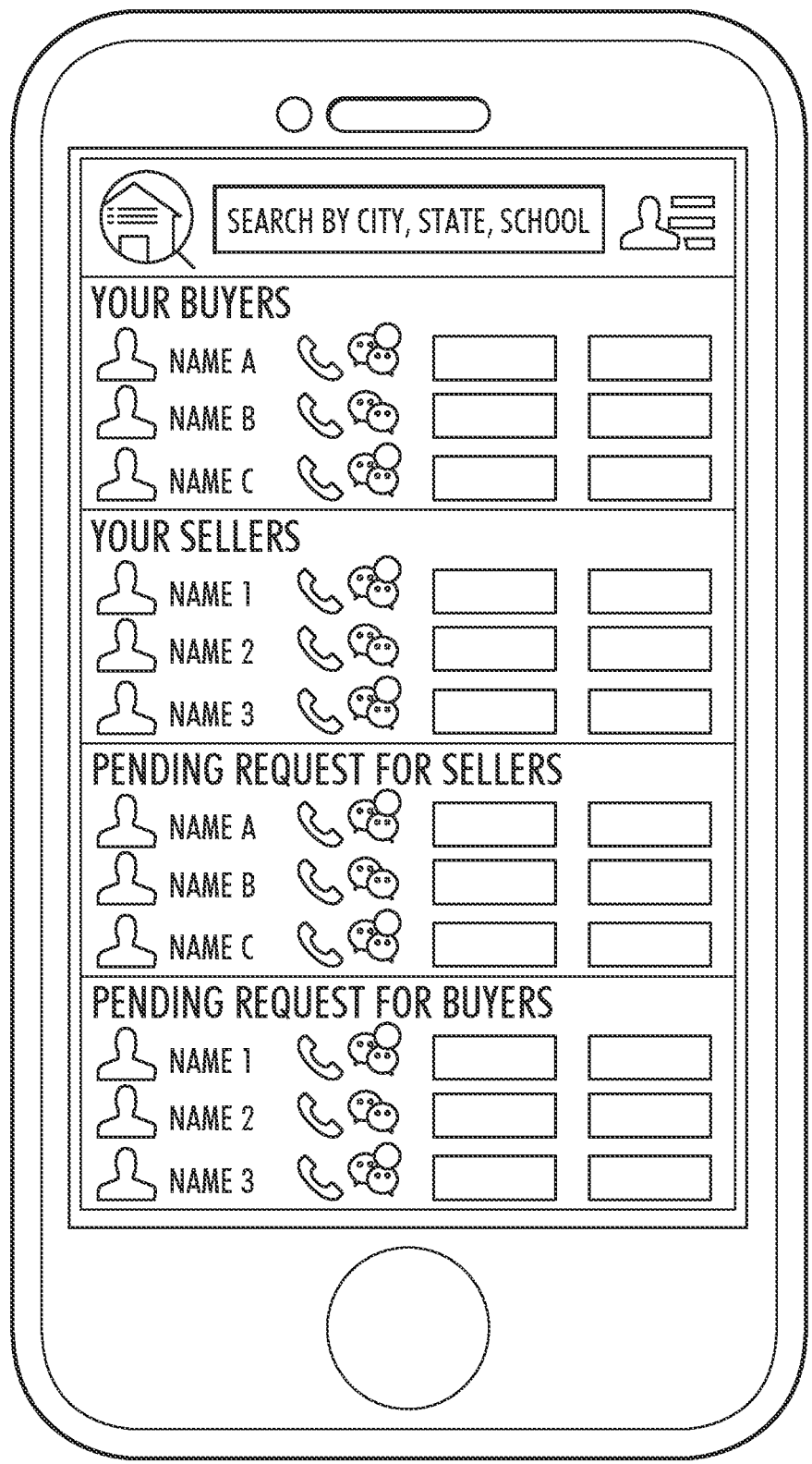

Features (FIG. 22):
Your buyers (remove, connect, share)
Your sellers
Pending buyer user request
Pending seller user request The agent version can be accessed from a website and/or downloaded from iTunes or Google Market Place or the "Play Store", as examples, to the customer mobile device (phone or tablet).

The simple search feature searches the MLS database on the agent's search criteria entered (e.g. city and state, zip code, school, address, MLS #). The agent can also search for customers or users based on such things as first name or last name, MLS #, and/or address. The simple search feature is located at the top of the application on all pages throughout the app.

The customer can search based on:
Customer (first or last name)
City and State
School
Zip Code
MLS #
Address The agent app searches the MLS database based on the agent's search criteria. The agent can then save the search criteria for later use. Once the agent finds the home, they can add to their customers "My Favorites."

Figure 23:
Figure 24:

Features (FIG. 23):
iii. Search Tools
Advanced search
Saves searches
Open houses
iv. Settings
My profile
Manager user request
Share Quitchet/Improve Quitchet
Terms of Use
Sign Out Closer Look—Advanced Search: When the agent selects "Advanced Search" from the menu of FIG. 24, the screen will appear in the body of the application. The agent can set their search criteria and can click "Save & Search" (this will save the search criteria to their Saved searches) or they can simply click "Search."

Features (FIG. 24):
Home for sale
Homes under contract
Homes recently sold
By Price
Number of beds
Number of baths
Home type
Key words (features)

Figure 25:
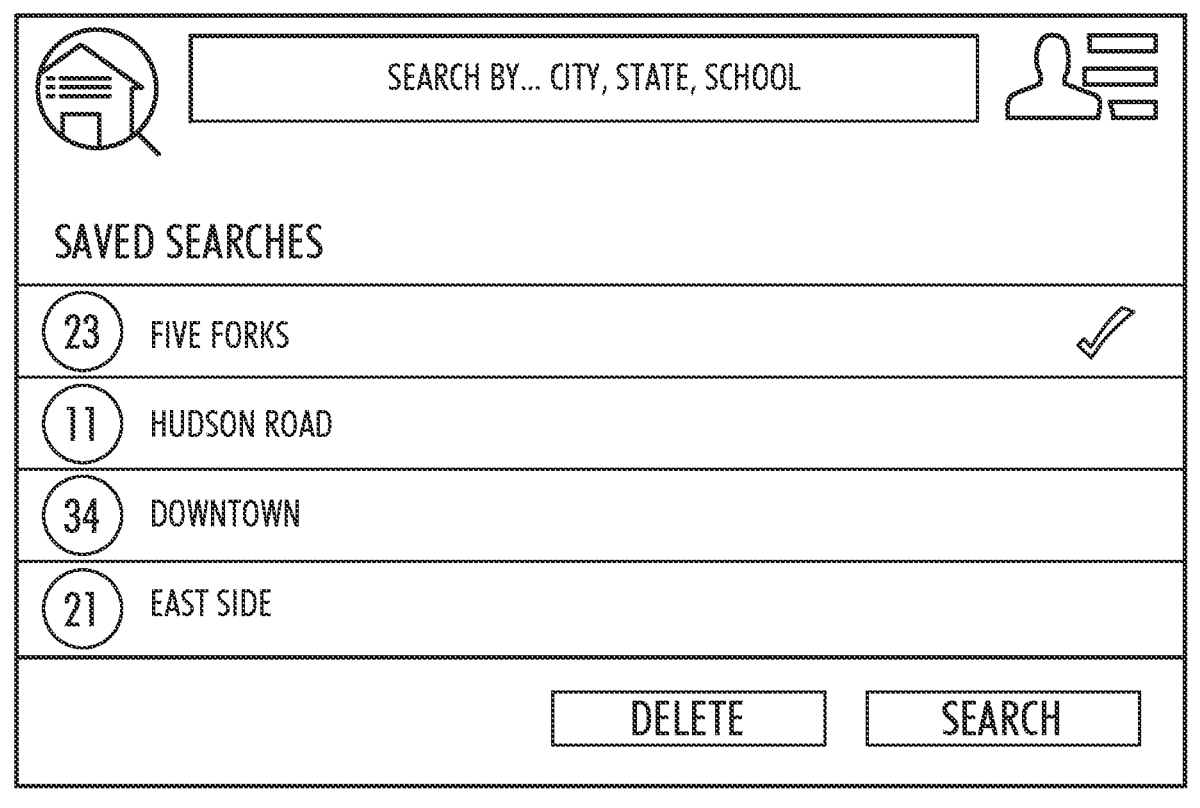

When the agent selects "Saved Searches" from the menu, the screen of FIG. 25 will appear in the body of the application. The agent can select a previously saved search from the list.

Figure 26:
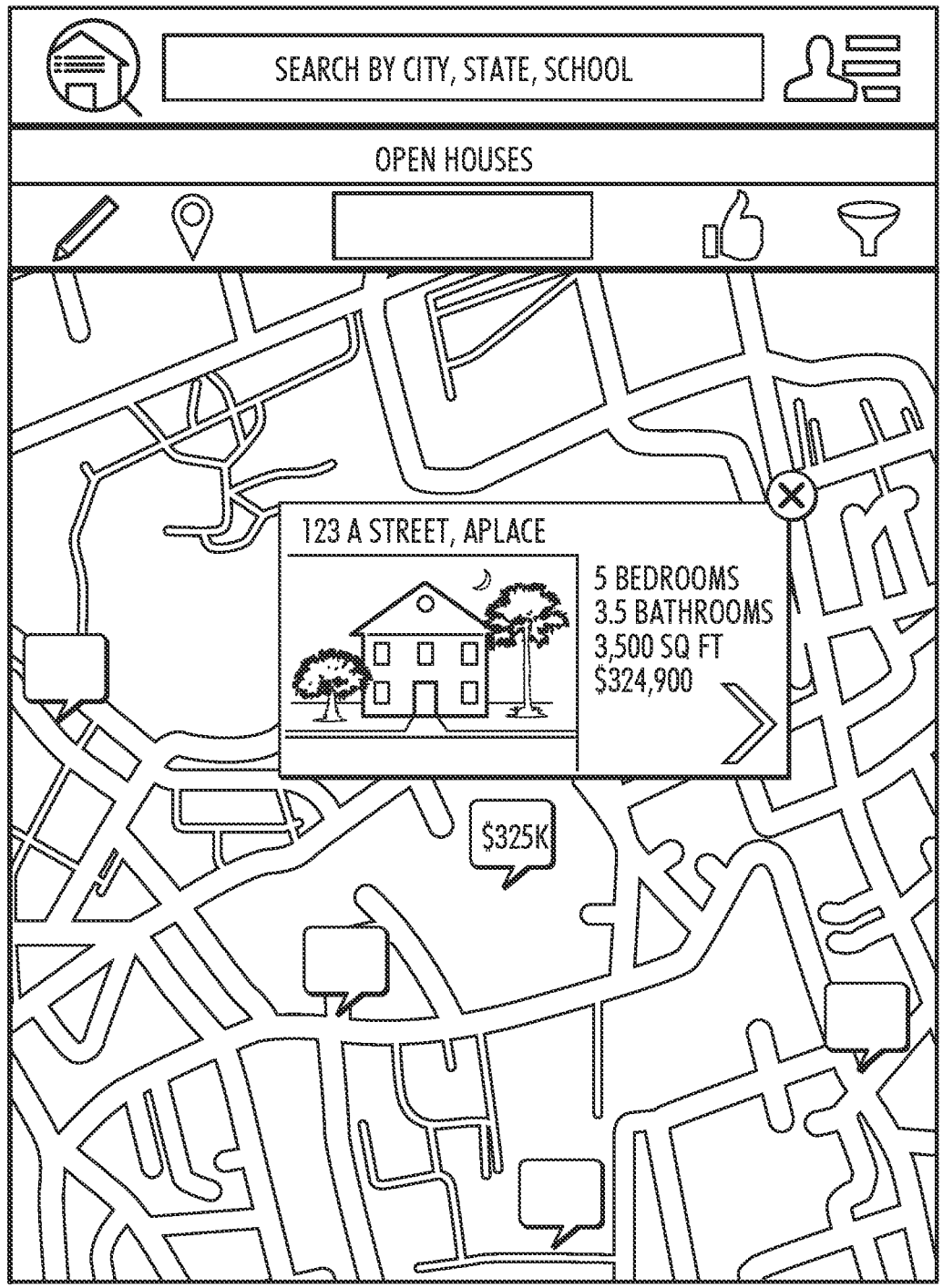

Features (FIG. 25):
Displays number of houses in that search criteria
Lists the saved search title
Delete selected saved searches When the agent selects "Open Houses" from the menu, the screen of FIG. 26 will appear in the body of the application. The agent can select one of the Home icons to reveal the details of the home. The agent can search a specific area for Open Houses or they will show the ones in their saved search area(s). The agent can "add an open house" if they wish to schedule one of their listings for a future date and time. The Open House can be added from their listings that are automatically loaded into the app. This will show to all users in the open house search field.

Figure 27:
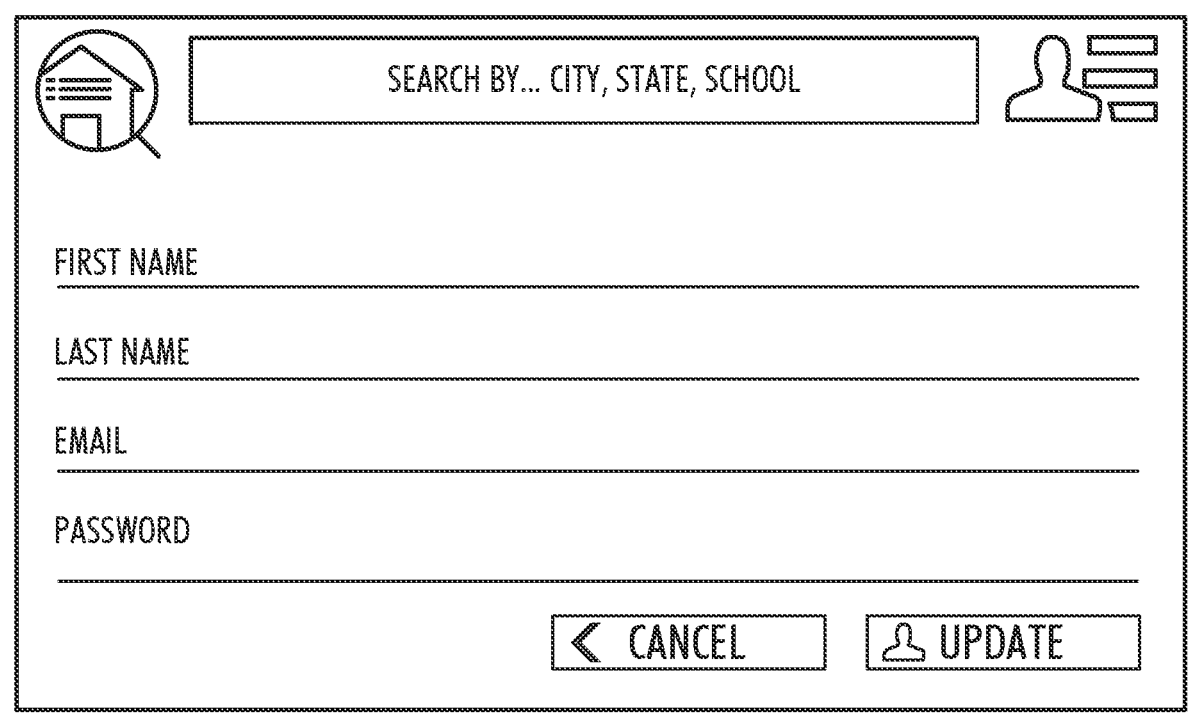

Features (FIG. 26):
Address
Main photo
Beds
Baths
Square foot
Price
More link (right arrow)
Directions When the agent selects "My Profile" of FIG. 27 from the menu, the screen will appear in the body of the application. The agent can edit their basic information and can also add/edit a full profile visible to all users. A "buyer's packet" can be forwarded to any customer through the app when selected as an agent by a user and accepted by the agent as a customer.

Features (FIG. 27):
First name
Last name
Email
Password

They can also add/edit a full profile visible to all users, add a "buyer's packet" that can be forwarded to any customer via the app when selected as an agent by a user and accepted by app as a customer function.

Figure 28:
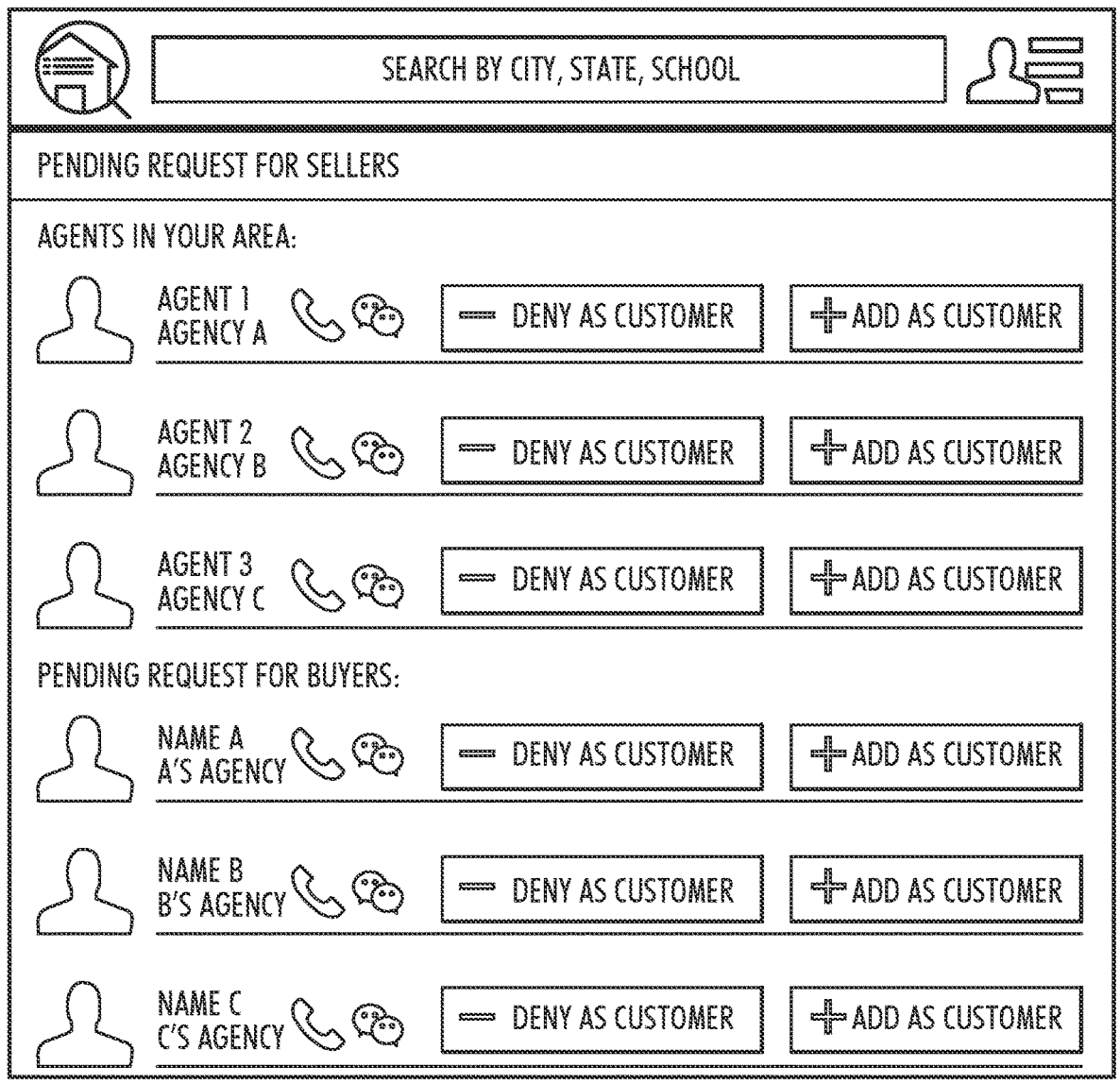

Closer Look—Manager user request: When the agent selects "Manage user request" from the left menu, the screen of FIG. 28 will appear in the body of the application. The agent can manage user request to join as a customer if so desired.

Features (FIG. 27):
Call
Text
Deny as customer
Add as customer

When an agent selects "Add as customer" an email and text will be automatically sent to the user welcoming them as a new customer. This will include the "buyer packet" if created by that agent. The user is then added to the Agent customer (home) screen once they have accepted the invitation. This agent becomes that users "My Agent."

Figure 29:

When the agent selects "Share" of FIG. 29 from the left menu, the screen will appear in the body of the application. The agent can help improve the app by leaving feedback. They can also share information with others.

Features (FIG. 29):
Improve this app
Facebook
Twitter
Text Message
Email

When the agent selects "Terms of Use" from the left menu, agent can read the corporate Terms of Use for the mobile app.

When the agent searches for homes in the agent version, the results are displayed in a Map view. The agent has access to several features:

Features list:
Left icon: link to left menu features, search & settings.
Quick Search: type in city, state, or school.
Right icon: link to right menu features in My tools.
Logo: link back to main map page
Draw icon: draw on app the area searches boundaries.
Map icon: searches homes based on customer current location/GPS location.
Search icon: filter homes by for sale, under contract, recently sold, price, beds and baths.
Home pop up window: shows basic information about home selected.
Map icons: color coded map icons showing location of homes.
Map button: takes user back to homepage (this page).
List button: shows the homes based on the search criteria in a list view.

When the agent selects a home from the search results, the details of the home (pulled from MLS) will be displayed. The agent can add this home to their customer(s) "Agent suggested homes" section within the customer app.

Features:
MLS details
Directions
Share with Customers
Image slider
Agent Tools

Figure 30:

The agent version has a set of agent tools designed specifically for the agent. The tools are located on the right slide out menu (FIG. 30.)

Features:
My customers
Schedule an appointment
Scheduled appointments
Customer chat messages
Compare homes
Showing feedback
Check In/Out When the agent clicks on "My Customers" the agent has access to the customer and user who is requesting to be a customer. The agent can manage their customers and access each customer "My Favorite Homes."

Figure 31:
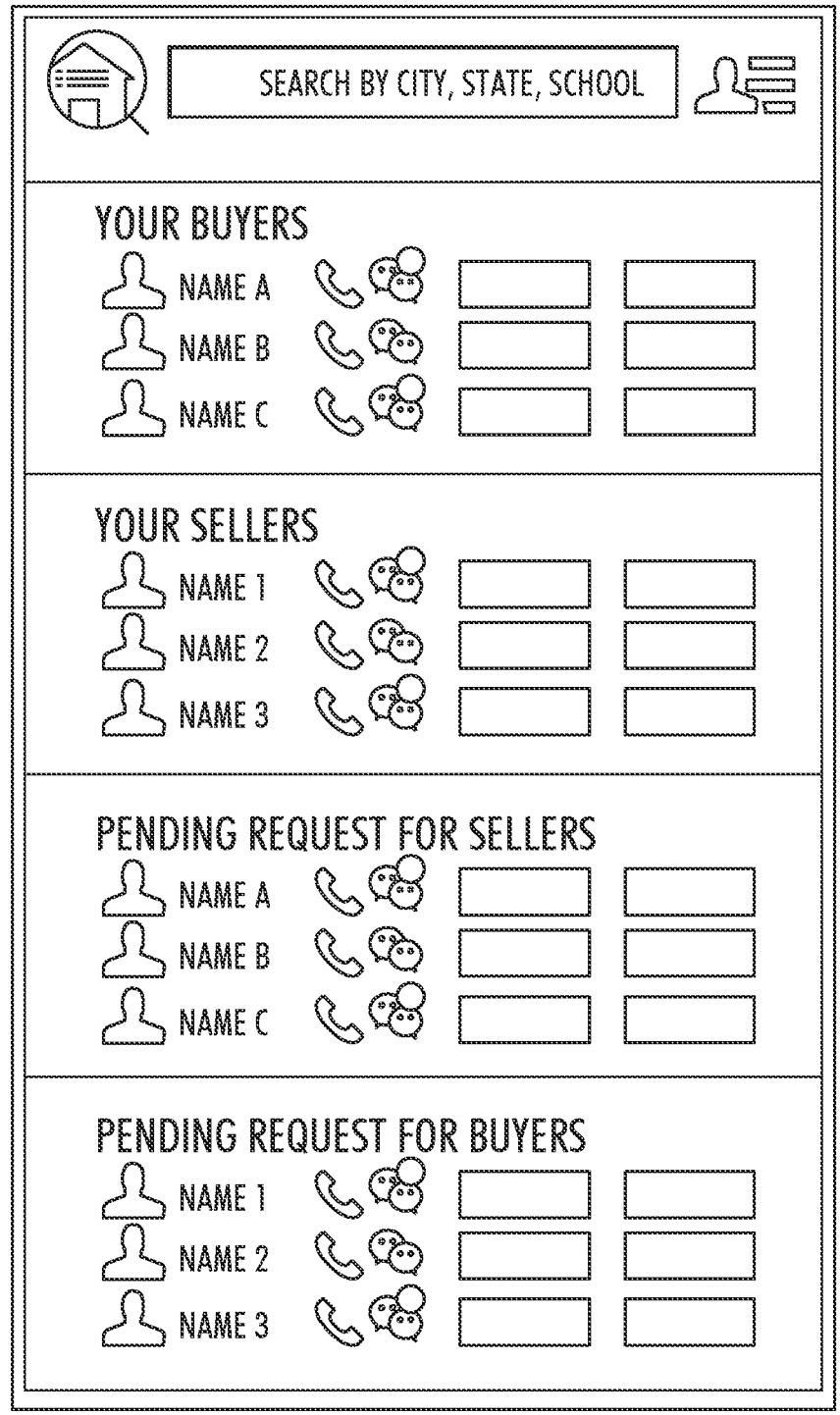

Features (FIG. 31):
Phone
Chat
Remove customers
Add customers
Deny user request
Access Favorite homes (by customer)
Closer Look—Schedule an Appointment When a customer requests a showing the agent is notified via mobile pop up. The agent can then view all the showing requests grouped by customer. When order is selected all phone appointments are grouped by contact telephone number with time slots noted by each home. The agent can place multiple appointments in order by selecting the first home in the list view and confirming the date and time. They can also be viewed/arranged in map view by touching the map screen. In some embodiments, the app auto schedules base don a formulate that calculates drive time, dwell time in each home (optionally set by the agent) and determines the best arrival time at each home (settable, for example, to the nearest quarter hour). The agent can phone or contact the MLS indicated party (individual or appointment contact company) populated from the MLS information to schedule a showing. The appointment can be expedited through the scheduler of the application connecting with other automated scheduling third-party software, for example. The agent would then confirm the date and starting time and the app would notify customer via the app with the details after the appointment has been confirmed.

Figure 32:
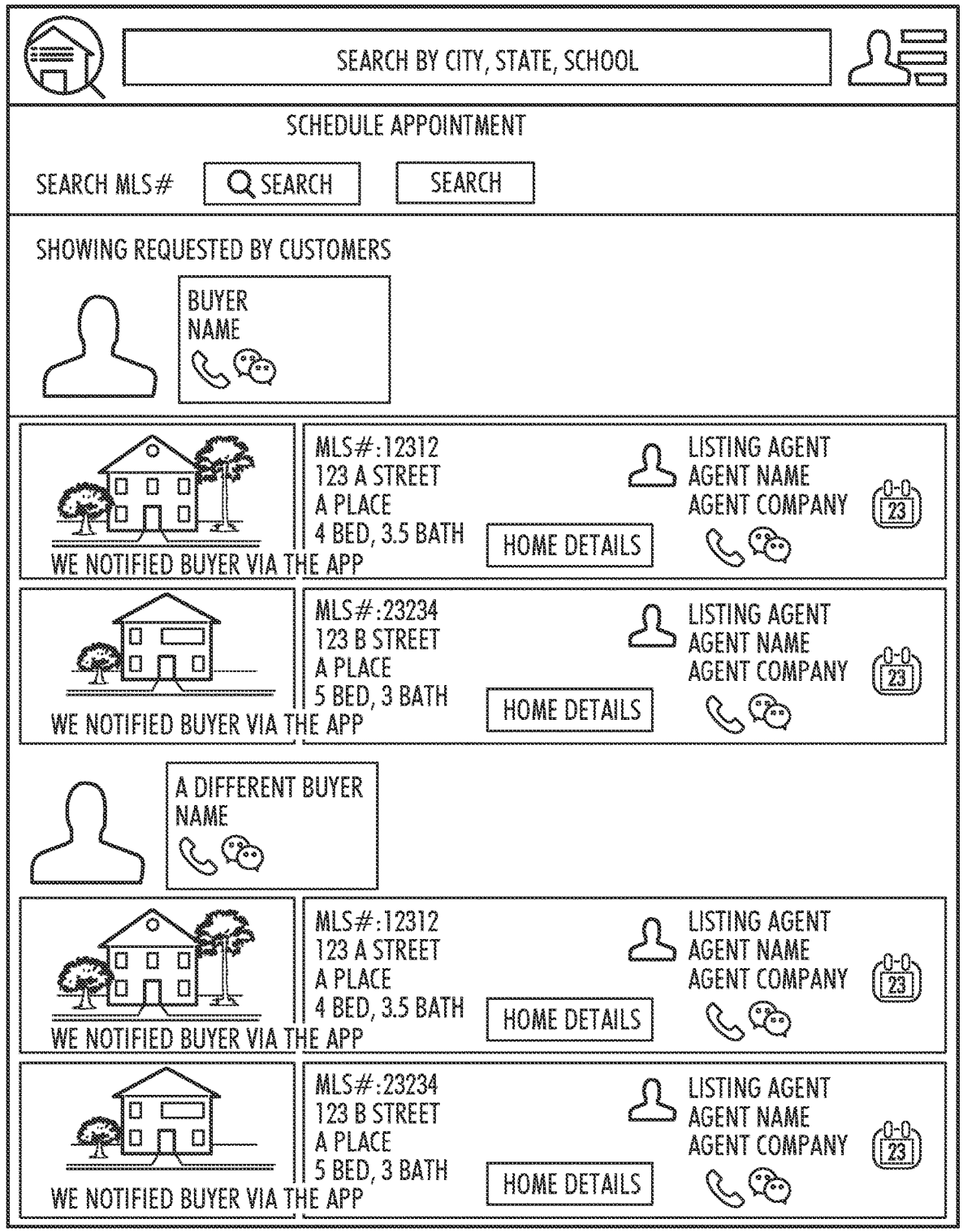

Features (FIG. 32):
Customer information
Home details
Direct text or email chat
Designated contact company or Listing Agent phone, text, email or link
v. to schedule appointment (from MLS data)
Schedule showing PRO app shows the listing agent contact name and listing number and email in this view and scheduled showing view for ease of contact prior to or during showing session.

When the agent sets the appointment in the app, the application will set the date and time of the appointment in the calendar of agent's customer and the agent opt to send the listing agent and seller an email or text alert/message when arriving and leaving the appointment.

Figure 33:

Features (FIG. 33):
Notify seller and listing agent
Set date and time range

The agent can view all scheduled appointments for each customer. Once the agent has scheduled an appointment the agent can export to/view in their mobile calendar on this page.

Features (FIG. 34):
Customer name
Showing date and time

Email customer
Call customer
Directions: (always takes you from your present location if GPS is activated)—if not it will show from your designated "home" start point in your GPS.
MLS details (and image slider)
Check in/Check Out alert or manual function=when the agent arrives at the home, arrival (e.g. as sensed by GPS) will trigger a Detail Page to give options to:
b. View home
c. Enter feedback
d. Check in
e. Check out
f. Emergency alert The agent version allows the agent to check in and out of a showing.

Figure 35:
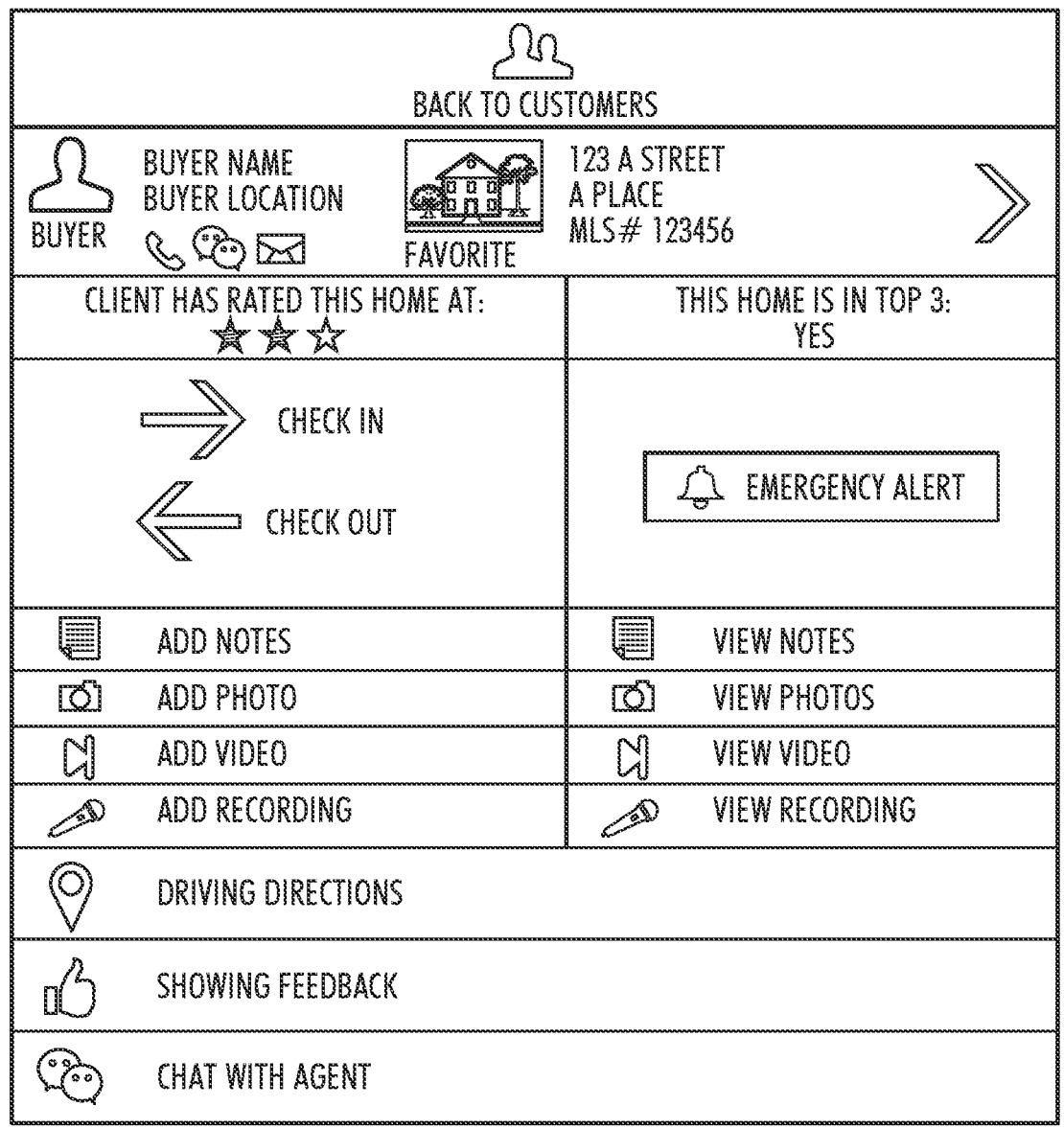

Check in/Check out alert functions appear when the agent arrives at the home, the arrival (e.g. as sensed by GPS) will go to the Detail Page which gives options to see all or some information about the home, plus a safety timer appears at the bottom of the screen along with a 911 button, for example to call help and/or the agent's brokerage and/or law enforcement with a one touch button.

g. (FIG. 35)
My Customers
Contact my agency
Leave feedback
Check in—this button can activate app needed for lock box access
Check out
Emergency alert
Closer look—Customer chat messages The agent app allows the agent and customers to chat around each home. This ensures that all conversations (chats) are grouped and stored within the appropriate home. The Customer chat message is a list of all the homes that have a chat session. The agent can select the home and review/start or continue a chat dialog. The most recent is always at the top and an unanswered chat on each home will be indicated by a bubble icon.

Figure 36:
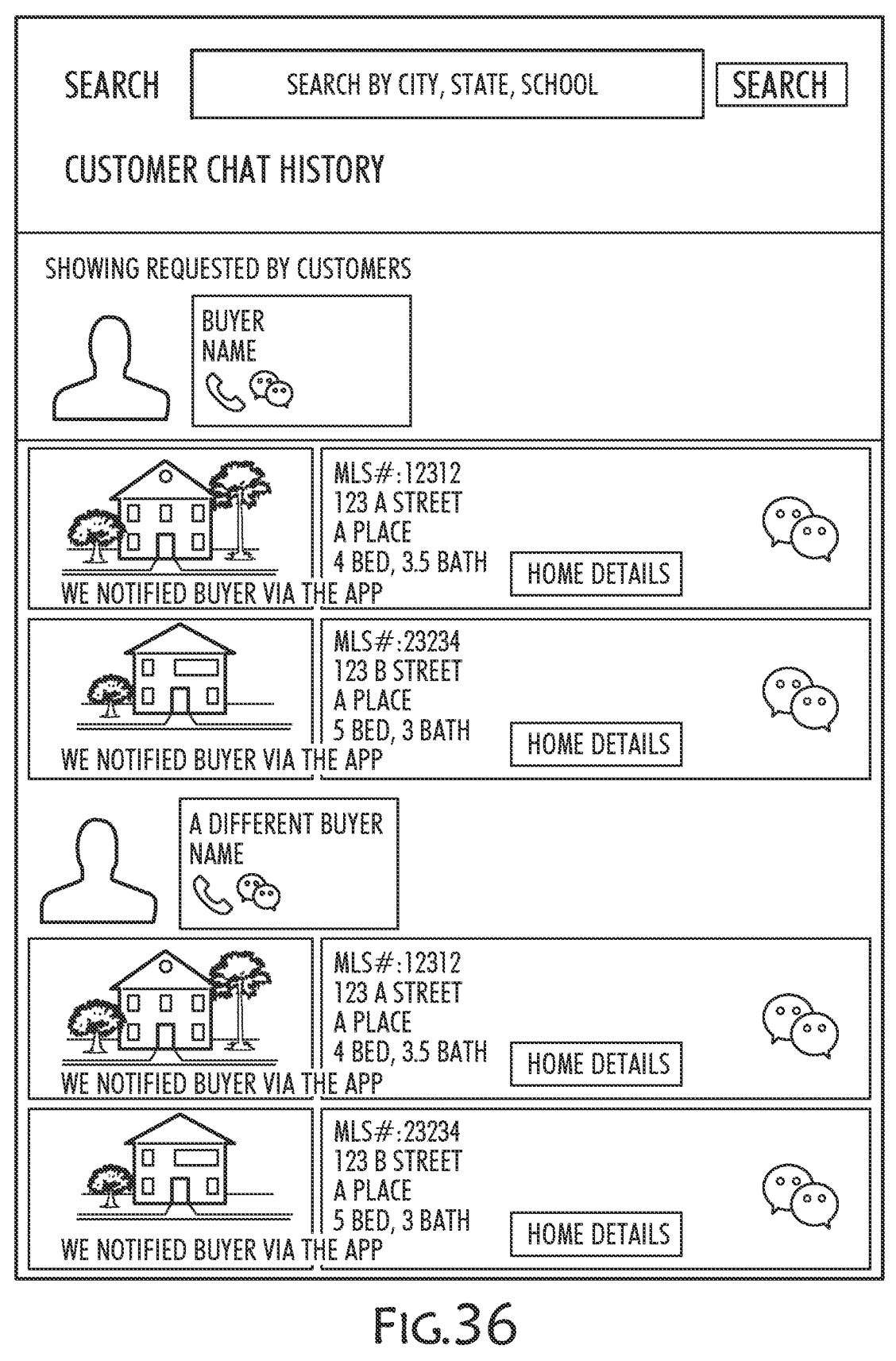

Features (FIG. 36):
Back to search
Chat with customer or agent on each home
List of homes with chat session Separated by general chat with customer and by homes.
Closer Look—Customer Chat—History Once the agent selects the chat icon on a home (see above) the agent is taken to the chat history between the customer and agent around that home.

Figure 37:
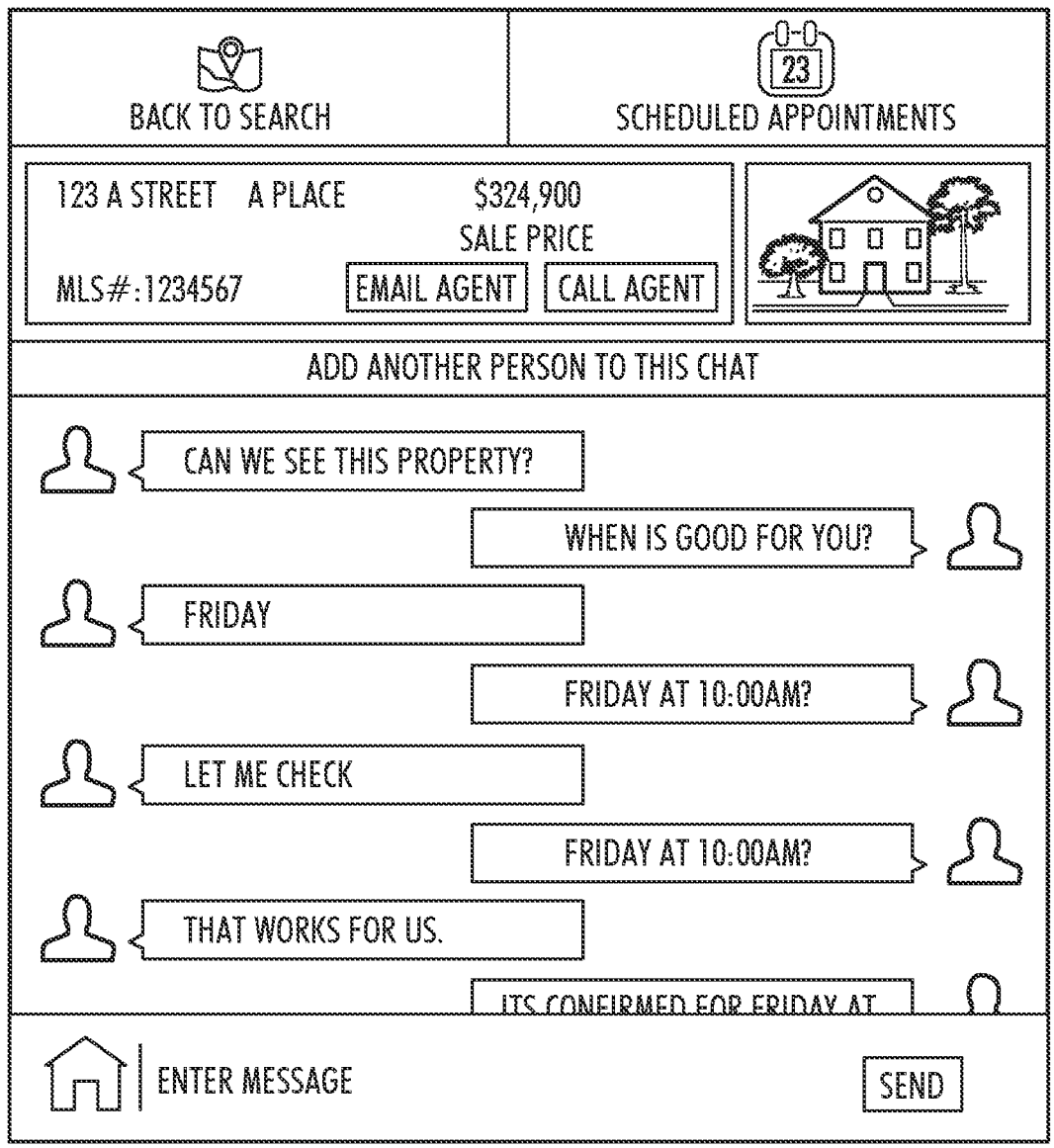

Features (FIG. 37):
Back to search
Schedule a showing
My Favorites
Add to Favorites
Display House Details
Email customer
Call customer
Picture of customer and agent
Enter message
Link to Map/Home The Compare Homes feature allows the customer to select as many homes as they desire from the "Favorite Homes" list. Once the homes are selected and then added to the "Compare Homes" page the customer can compare all the details side by side for each home.

Figure 38:
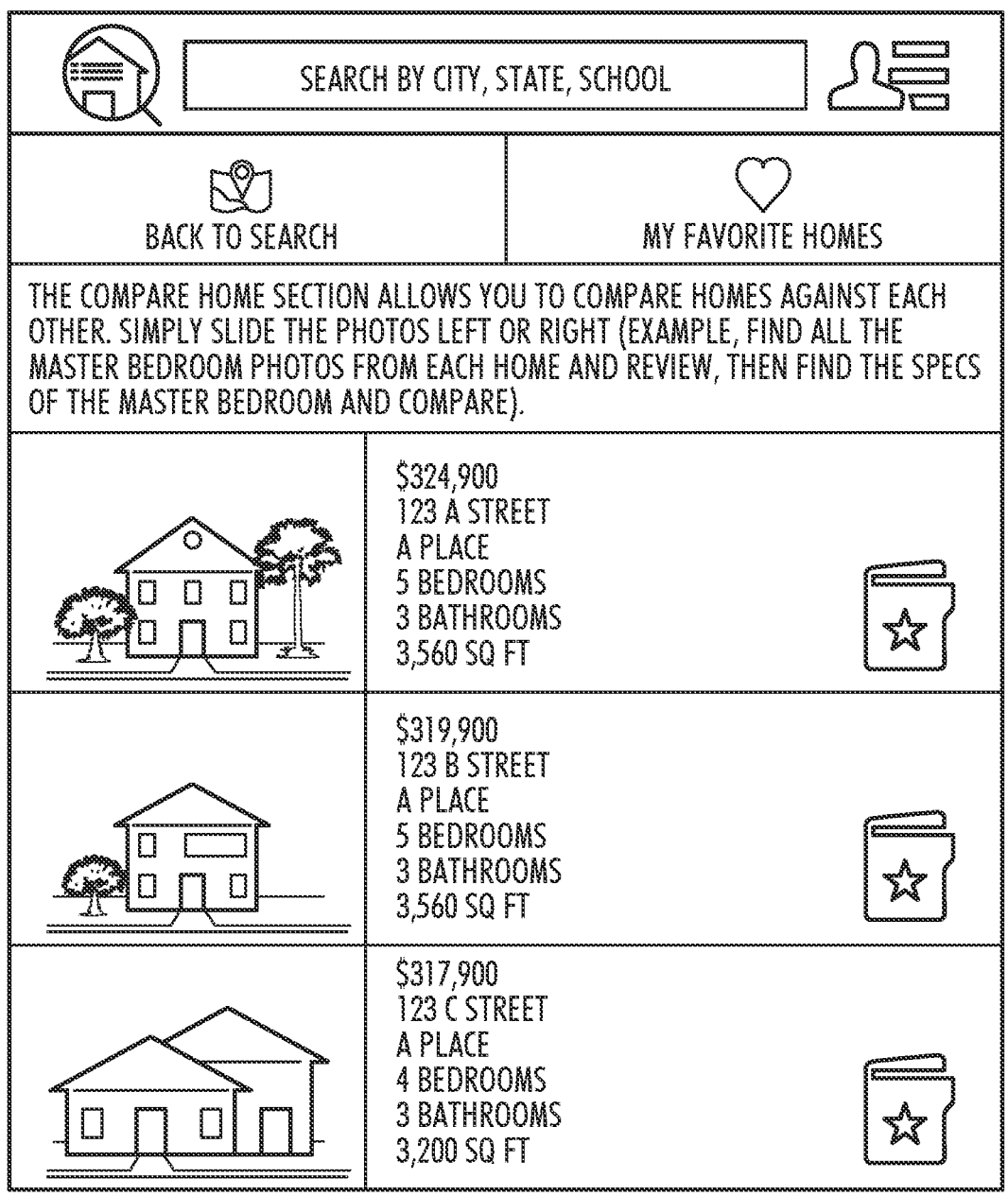

Features (FIG. 38):
Back to search
My Favorite homes
Images (slide left and right)
MLS details (slide up and down)
Home Page (access all personal images, notes, video, audio, scheduled showing and chat messages.)

The Closer Look feature allows the agent to access all the apps that make up the customer version for each customer.

Figure 39:
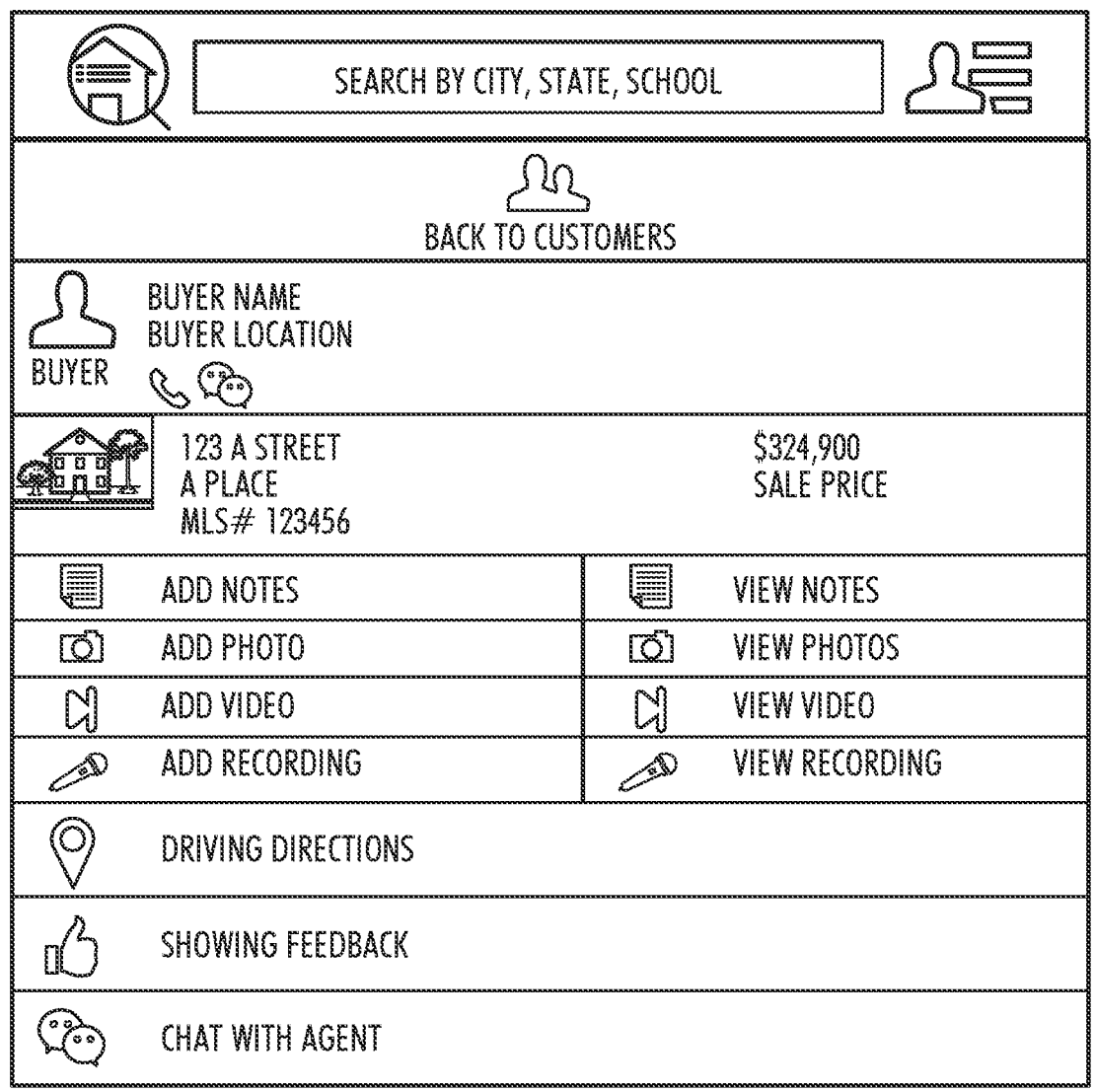

Features (FIG. 39):
Back to search
Home details
Email agent
Call agent
Add/edit notes
Add/edit photos
Add/edit video
Add/edit voice recording
Request showing
Driving directions
Chat with agent
The Closer Look—Showing Feedback—form This feature allows the agent to complete the feedback based on the comments given to them by the buyer and then send feedback on the home (after they have visited) back to their account to be forwarded later to the listing agent.

Figure 40:

Features (FIG. 40):
Speech to text general comment
Type general comments
Sent to agent via email
Auto updated on Scheduled showing that Feedback was left
The Closer Look—Showing Feedback—Manager This feature allows the agent to view and send the feedback to the listing agent.

Figure 41:
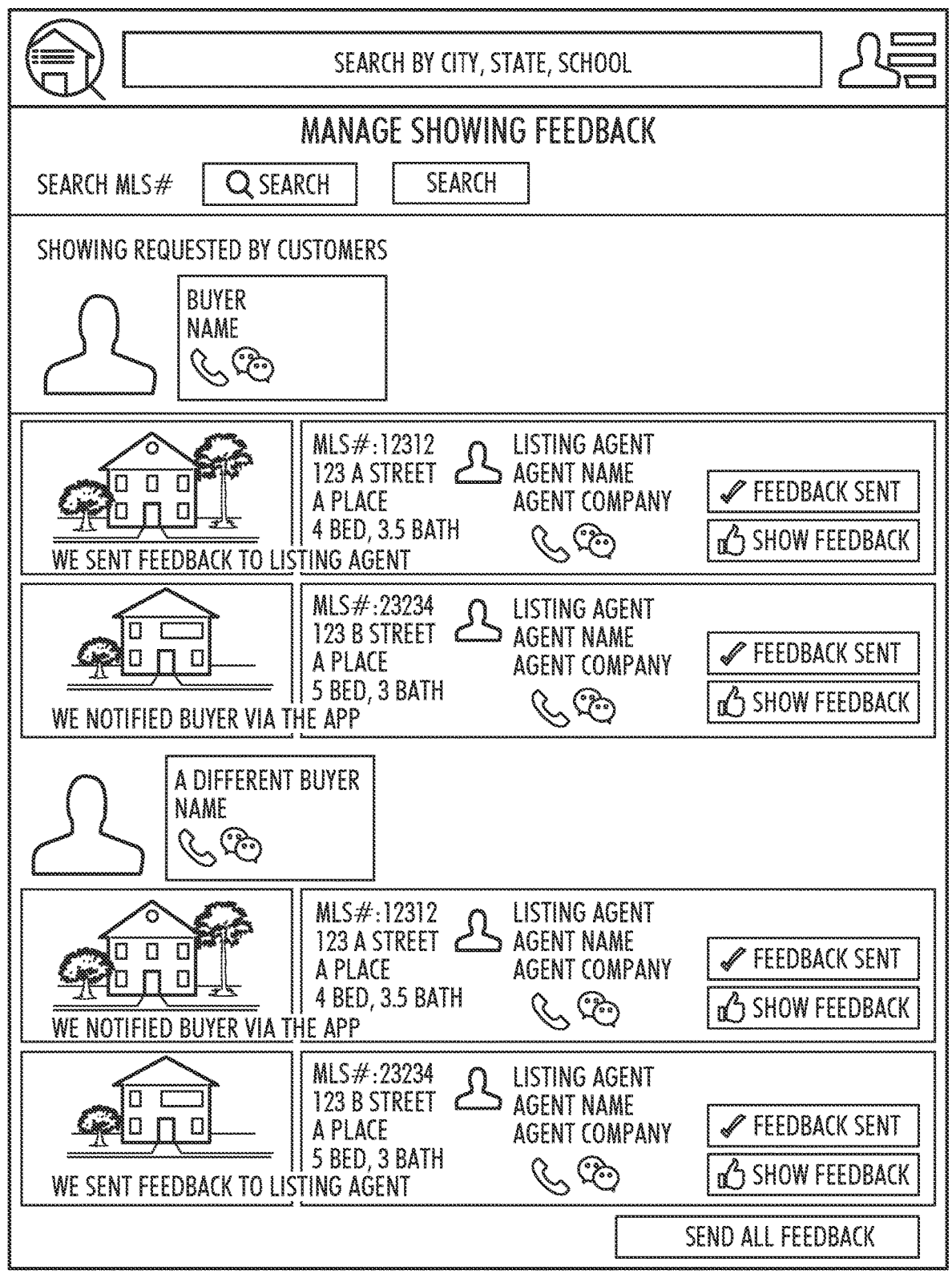

Features (FIG. 41):
Phone or chat with customer
Send feedback to listing agent
Add feedback for customer
Phone, text or email listing agent There are additional features within the agent version to allow for the schedule of showings through the chat features and link to the listing, setting up schedules, showings and verification through the appropriate contact, either a call or showing center, listing company, listing agent or individual, as designated in the listing information. This can be done by text, email, or hyperlink. After confirmation, it is forwarded to the customer for acceptance and loaded into their calendar.

The agent version also has an additional feature that begins to establish procedures for closing. It allows the agent to schedule inspections, link to inspectors, attorneys, and all other parties involved in the closing process. The agent version has safety features; one feature allows the "safety showing screen" to remain on the agent's screen during the open house. They will check in for the start of the open house and check out when all is clear and they are in their car safely. A "911" button is always up for emergency use. The Agent or the Customer viewing the open house can also complete feedback while viewing the home and send it to the listing agent who can then forward to the seller for completion of the open house. The seller then knows that it is safe to return to the property.

III. The Manager Application

The Manager version is designed specifically for the manager of the agents. The manager can view each agent's scheduled showings. The manager can view the scheduled times, check in and check out status, and how long the agent has been Agent picture
Phone number/link
Dial 911
Appointment date and time
Address
MLS number
Map link
Customer name and phone number
Check status with time stamp
Check out with time stamp
Timer which stays running until check out
Data gathering to create reports for agents on items such as the number of homes shown until sale, miles traveled, number of customers lost/not converted to sale, etc.

As can be seen from the above description, the systems and methods for managing real estate information described herein represent significantly more than merely using categories to organize, store and transmit information and organizing information through mathematical correlations. The systems and methods for managing real estate information are in fact an improvement to the technology of access control for the premises at which open houses are conducted, as they permit the real estate agents to enter check-in and check-out information regarding the real estate customers at the open houses and to notify a seller that a respective one of the open houses has been concluded. This facilitates the ability of the seller to reenter the premises of that open house sooner and with greater certainty. Moreover, the systems and methods for managing real estate information are confined to residential real estate applications.

One or more currently preferred embodiments have been described by way of example. It will be apparent to persons skilled in the art that modifications and variations are possible without departing from the scope of the claims as purposively construed. In construing the claims, it is to be understood that the use of a computer (including for greater certainty a networked mobile wireless telecommunication computing device) to implement the embodiments described herein is essential.

IV. Safety Engine

Figure 42:
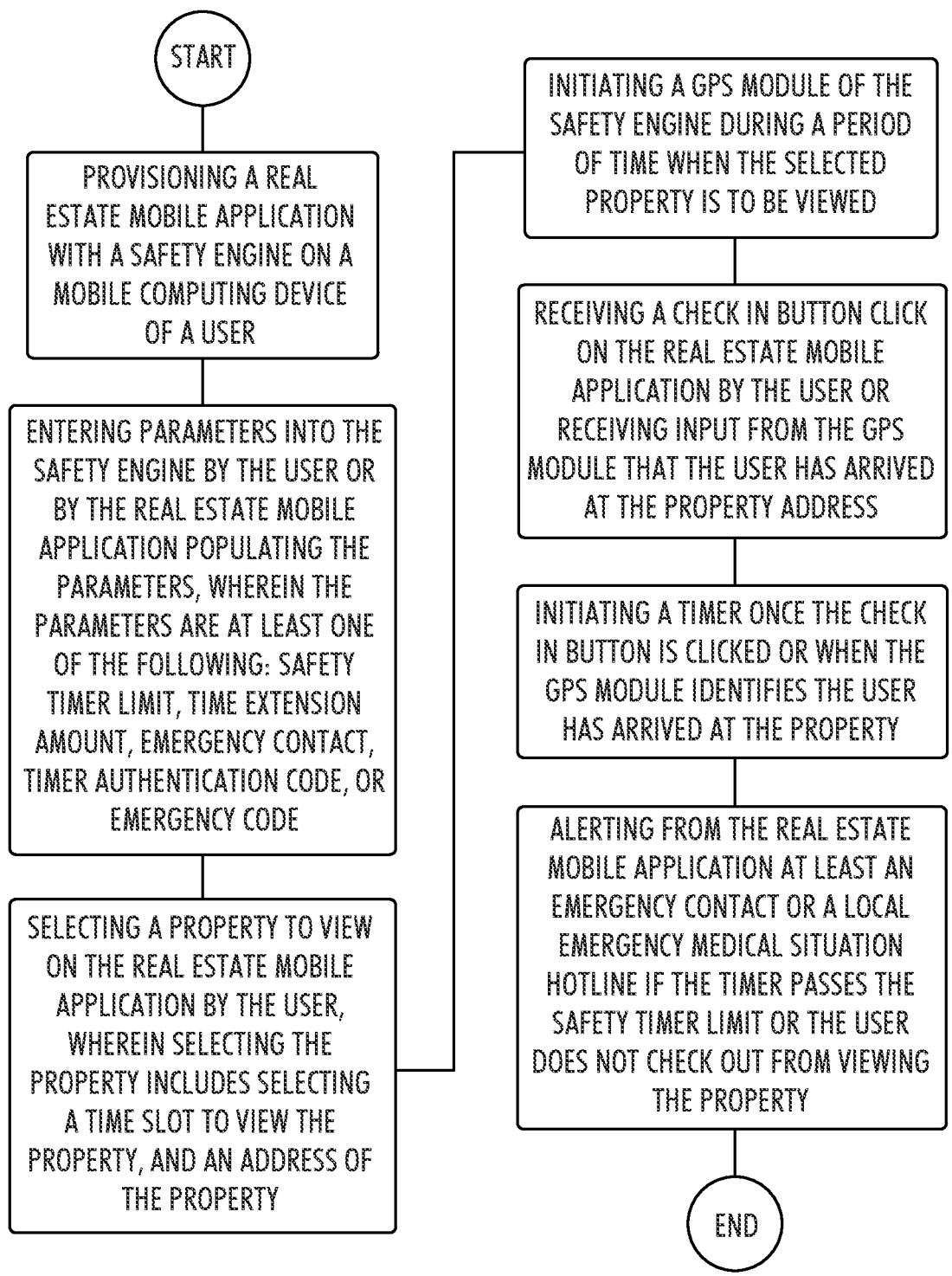
FIG. 42 is a flow diagram of an example method for enhanced safety tracking in real estate transactions.

Referring now to FIG. 42, a flow diagram of an example computer implemented method for enhanced safety tracking in real estate transactions. In one aspect a real estate mobile application is provisioned on a mobile computing device. Wherein the mobile computing and real estate mobile application may be used by buyers, sellers, or agents thereof. In the example method parameters are entered into the safety engine either by the user manually entering in the parameters or the safety engine adding default or calculated parameters. Further, the parameters may be added automatically with intelligence based on previous visits. For example, if a user is known to tour homes for thirty minutes, the safety timer limit may be populated by the safety engine as thirty minutes, based on previous experiences. These previous experiences may be derived from log files transmitted as the application records visits of check in and check out timelines. It may also be estimated based on property size or real estate square footage.

Example parameters that the safety engine may populate or the user may enter include a safety timer limit, a time extension amount, an emergency contact, a timer authentication code, and an emergency code. Additional parameters may be available, such as a geo-fence limit, or a logging parameter that allows for data about relative position of the user to be logged within the application. Further, beacon technology may be employed, wherein a beacon may be tied to the safety engine parameters so that when the user is touring, if the beacon indicates the user's mobile computing device is not moving, it may send an alert based on feedback from the safety engine. In populating the safety engine or real estate mobile application may use user experience from logged data to populate information. For example, if the user has historically requested timer extensions, the application may automatically populate a longer timer duration for visiting locations.

With regard to the parameters in FIG. 42, the example includes at least one parameter. In other aspects, all parameters may be required, or a subset of parameters. A safety timer limit is a timer that determines how long after checking in will a notification or alert pop up or display on the mobile computing device. This security aspect may also send a notification via the real estate mobile application to a data server that may log the user as receiving the notice. In further aspects, the safety time limit also sets the countdown before dialing an emergency contact, such as a set emergency contact or an emergency hotline—911. Additional parameters include a time extension amount that allows a user to extend the timer limit. For example, if a user wants to sit down with a realtor at the property to discuss options, the user may extend the timer limit so as to not require a check out. Further, the extension may or may not be accompanied with a timer authentication code. The timer authentication code verifies the user has given access to extend or otherwise check out and is an additional layer of security. An emergency code operates similar to the timer authentication code as an extra layer of security. In one aspect the emergency code triggers a silent alert, wherein the emergency contacts are alerted and the timer continues. In one aspect, the data servers connected to the real estate mobile application may push a timer code request when it is detected a user has not checked out or the checkout was canceled or other anomaly. Further, an emergency code request may be sent or an emergency code may be entered by the user to prompt a notice of an emergency.

Continuing with the example method in FIG. 42. A user selects a property to view and may initiate the viewing request from the real estate application. When selecting the property, the user also selects a time slot for viewing. The address information for the property is available and is also input or data for the safety engine. Next, the user embarks or visits the real estate property scheduled to view, in doing so the GPS is initiated on the mobile computing device and is triggered by the real estate mobile application. This may be coordinated with an invitation from a calendar or the application may trigger because the specific time slot is arriving. When the GPS module initiates it takes the relative coordinates of the user's device and continues to log or store the coordinates through the visit. The GPS module may also register the check in when the user arrives at the property address. Further, the GPS module may also register the check out when the user leaves the property address. In one aspect the safety engine drives notices and alerts from information acquired from the GPS module.

Next, the user either clicks the check in when arriving at the property or the safety engine, through the GPS module registers a check in upon arriving at the property address the user is viewing. Upon arriving, the safety engine initiates a check in timer or timer, which may be triggered by the user's check in or by the GPS module indicating the user has arrived, along or in coordination with time slot data. The check in time is the time utilized in triggering the expiration of the safety timer limit. The safety timer limit is based upon the check in time, and correspondingly the check in timer.

Continuing with FIG. 42, if the user does not check out or if the safety timer limit expires without a correct code entered or an incorrect code was entered the real estate mobile application alerts at least an emergency contact or a local emergency medical situation hotline. The real estate mobile application may further send an email to the emergency contact or send location data to a server that stores or logs a user's position. In alerting the real estate mobile application may use the phones cellular or wireless network and may place a phone call, a text message, an email, or other form of contact that emergency responders are capable of receiving. Further, the real estate application may verify or provide verification that an emergency hotline or emergency contact was reached and that help is on the way. The real estate mobile application may also signal the device to emit an audible alert in a repeating pattern or visual alert so as to help emergency responders locate the user. Further, from the data server side, an alert may be pushed to the mobile device wherein the safety engine may turn the alert into an audible signaling, overriding default settings so as to assist in alerting emergency contacts or responders.

In additional aspects, the real estate mobile application with a safety engine may prompt a user for a timer authentication code or timer code. Wherein the user may enter an emergency code that artificially extends the amount of time, but triggers a hidden emergency contact. In this aspect the emergency code serves as a "silent" request for assistance to an emergency contact on file or to a hotline for assistance. This aspect may be used when held hostage or when a wrongdoer requests a user to extend the time limit against his or her will. The emergency code in one aspect serves as an additional layer of security to cover situations in which the user cannot dial directly for assistance. Further, the emergency code allows for silent alerting and triggering of information so that authorities know a user is in a situation in which they may be forcibly held.

In other aspects, the safety engine may prompt the user for a timer authentication code, and if the user fails a certain number of times, or if a final countdown is reached the real estate mobile application may trigger the mobile computing device to alert authorities or call for assistance, such as a helpline, or local police, or 911. Further, the safety engine may transmit data back to the server for notifying hosts or for logging purposes to build a detailed map of the user's history when visiting properties. This may include the entire user's check in and check out history along with properties visited and GPS coordinates along with timer countdowns. Such information may be invaluable when attempting to locate a user.

Figure 43:
FIG. 43 is an illustration of an example user interface setting parameters within the real estate mobile application.

FIG. 43 is an illustration of an example user interface setting parameters within the real estate mobile application. The user interface is adaptable across a variety of mobile computing devices including laptops, smart phones, and tablets. In the example the safety time status indicates the safety timer limit. The safety time status or safety timer limit is the time allotted before the safety engine prompts the user to check out by entering a timer authentication code. The time extension amount is the amount of time to extend the users stay at the viewing location. The timer authentication code may be a 4-digit code or a multi-digit code, including a word, or it may accept any combination of letters, numbers, and symbols. In one aspect it is a 4-digit numeral code that may be easily entered. In other aspects it may be voice recognition of a user's recorded voice. The emergency code is the code entered when the timer prompts and signals a silent communication requesting assistance. The emergency code and timer authentication code may be specified by the user or may be automatically populated if requested and is then emailed to the user or otherwise communicated to the user. As discussed previously the safety timer status or safety timer limit may be populated from the user's touring history or may be manually entered by the user. Similarly, the safety engine may default the time extension amount or it may be derived or otherwise manually entered by the user.

Continuing with FIG. 43, the safety settings menu for the safety engine discloses examples of emergency contact information for when the timer expires and a code is not entered. In the example an emergency contact and prerecorded text is disclosed. In other aspect it may be set to call an emergency hotline, or in other aspects it may send an email and transfer data to a server for logging items such as the user's information and last known GPS coordinates.

Figure 44:
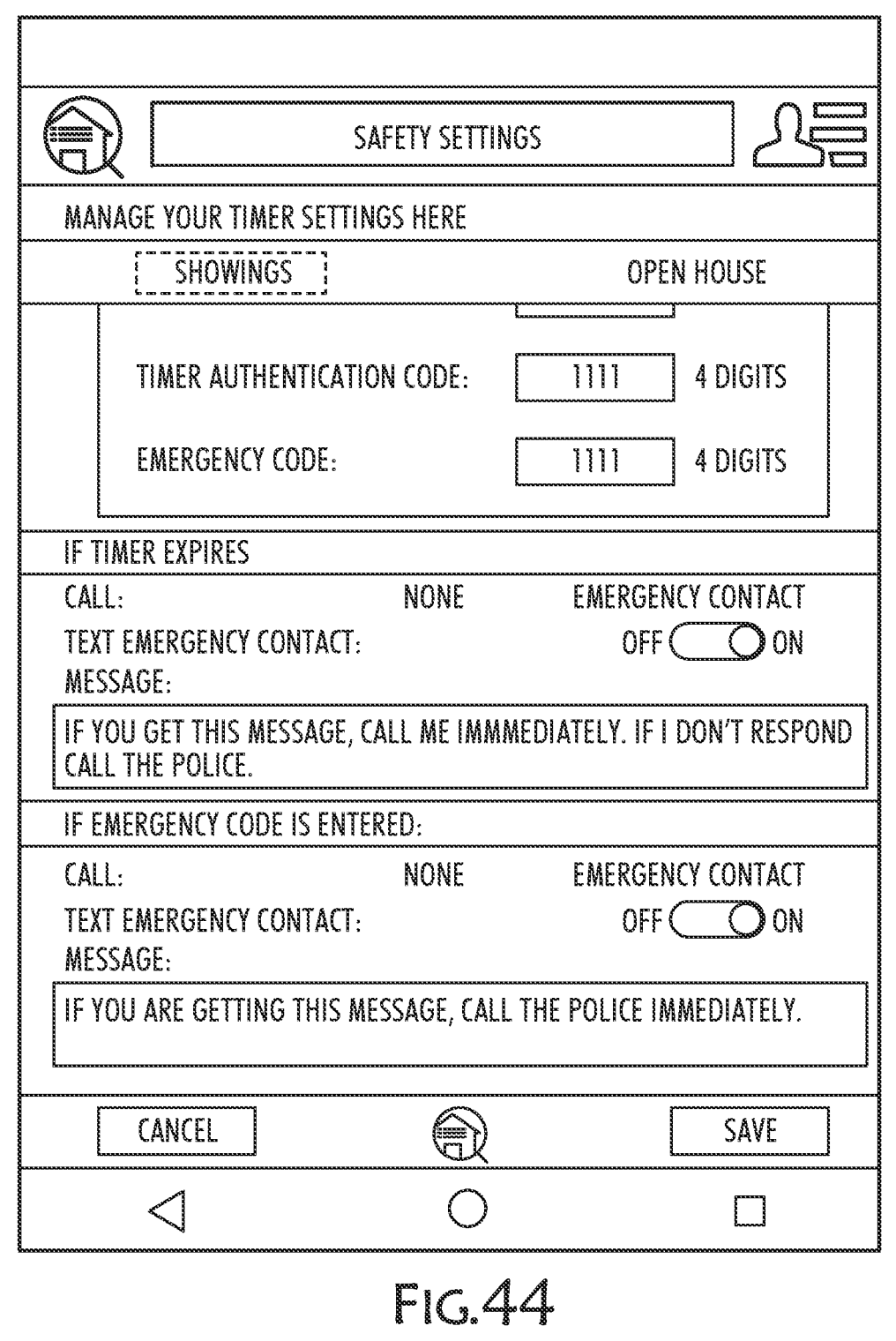

Referring now to FIG. 44, an illustration of an example user interface featuring toggles and fields for emergency contact information. In this aspect additional emergency contact information is displayed within the safety settings for use with the safety engine. This aspect shows multiple emergency contacts listed, wherein a user may specify more than one emergency contact and may customize the text or email alerts. Further, emergency contact's may be sent via multiple mediums, such as via email, text, or phone call.

Figure 45:
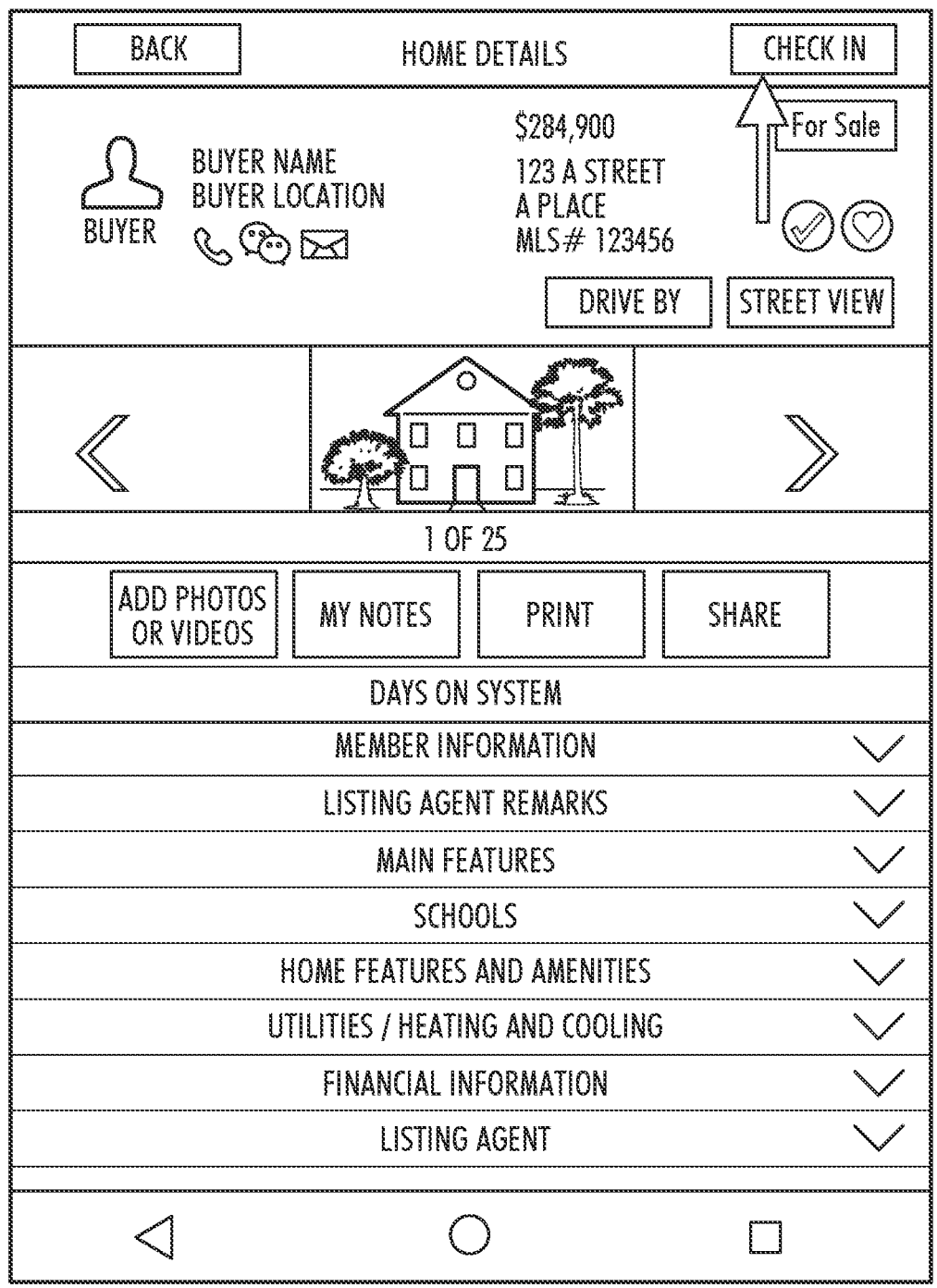

Referring now to FIG. 45, an illustration of an example user interface with a check in button along with GPS enabled checking in. In this example a user is presented with their information and the house they are visiting along with reference to items about the house or residential real estate. At the top right of the interface a check in button is available for manually checking in when arriving at a property. This may further be engaged by the safety engine working in coordination with a GPS module on the mobile computing device to trigger the user is at the present address. For example, the address listed in FIG. 45 may be activated when the user is within so many feet of the location, or may use destination arrival times from an API connected to Google Maps™ or other mapping software. Similarly, with check out, the check-out feature may be triggered upon leaving, or when the timer expires, or if the user manually enters it. When the check in is registered it may prompt for an authorization code, wherein the authorization code may allow for verified check ins versus accidental. Typically, the check in will not prompt for a timer authorization code.

Figure 46:
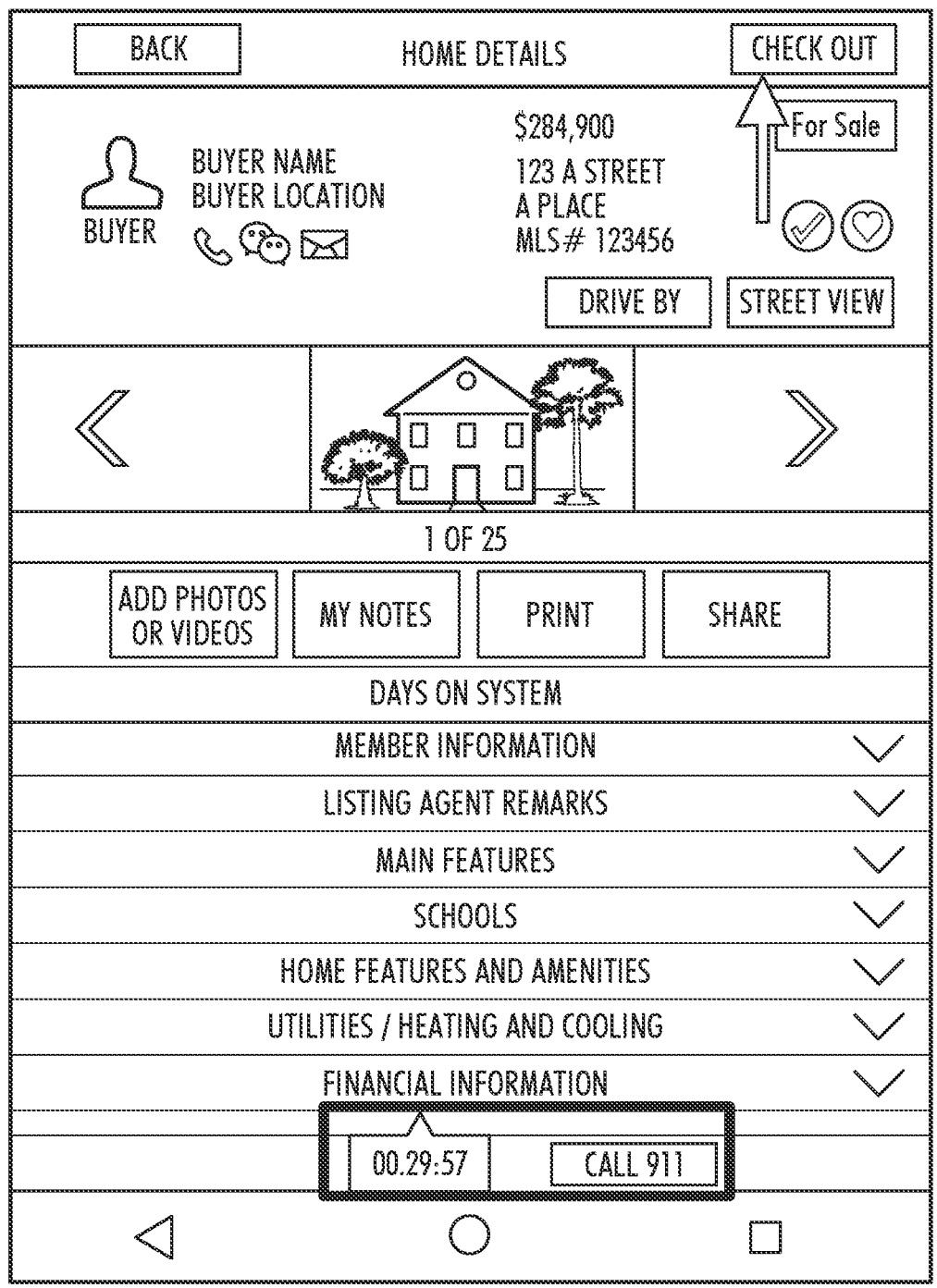
FIG. 46 is an illustration of an example user interface with a check out, showing also a timer and an emergency dial number.

Referring now to FIG. 46, an illustration of an example user interface with a check out, showing also a timer and an emergency dial number. In the example the timer or safety timer limit is displayed as 29:57, indicating the timer is running along with a call 911 option in the immediate bottom. There may also be a button for contacting emergency contacts. Further, the top right indicates a check out button which may be manually triggered and prompted for an authorization code. Or it may be triggered by the user's location based on the mobile computing device executing the mobile real estate application.

Modifications, additions, or omissions may be made to the systems, apparatuses, and methods described herein without departing from the scope of the disclosure. For example, the components of the systems and apparatuses may be integrated or separated. Moreover, the operations of the systems and methods disclosed herein may be performed by more, fewer, or other components and the methods described may include more, fewer, or other steps. Additionally, steps may be performed in any suitable order. As used in this document, "each" refers to each member of a set or each member of a subset of a set.

The invention claimed is:

1. A computer-implemented method for enhancing safety in real estate transactions, comprising:
provisioning a real estate mobile application with a safety engine on a mobile computing device of a user;
entering parameters into the safety engine by the user or by the real estate mobile application populating the parameters, wherein the parameters comprise at least one of the following: safety timer limit, time extension amount, emergency contact, timer authentication code, or emergency code;
selecting a property to view on the real estate mobile application by the user, wherein selecting the property includes selecting a time slot to view the property, and an address of the property;
initiating a GPS module of the safety engine during a period of time when the selected property is to be viewed;
receiving a check in button click on the real estate mobile application by the user or receiving input from the GPS module that the user has arrived at the property address;
initiating a timer once the check in button is clicked or when the GPS module identifies the user has arrived at the property; and
alerting from the real estate mobile application at least an emergency contact or a local emergency medical situation hotline if the timer passes the safety timer limit or the user does not check out from viewing the property.

2. The computer-implemented method of claim 1, further comprising prompting from the safety engine on the real estate mobile application a user for the timer authentication code, wherein the user enters an emergency code.

3. The computer-implemented method of claim 2, further comprising altering from the real estate mobile application when the emergency code is entered after prompting for the timer authentication code.

4. The computer-implemented method of claim 1, further comprising prompting from the safety engine on the real estate mobile application a user for a timer authentication code.

5. The computer-implemented method of claim 4, further comprising alerting from the real estate mobile application when the timer authentication code is not entered after prompting.

6. The computer-implemented method of claim 1, further comprising transmitting data back to a server the user's check in and check out history.

7. The computer-implemented method of claim 1, wherein alerting from the real estate mobile application also sends an email to the emergency contact.

8. The computer-implemented method of claim 1, wherein alerting from the real estate mobile application also emits an audible alert on the mobile computing device.

9. The computer-implemented method of claim 1, wherein alerting from the real estate mobile application also initiates a visual alert on the mobile computing device.

10. A computer-implemented method for enhancing safety through a real estate mobile application when visiting real estate listings, comprising:
provisioning a real estate mobile application with a safety engine on a mobile computing device of a user, wherein the mobile computing device is a GPS enabled smart phone;
entering parameters into the safety engine by the user or by the real estate mobile application populating the parameters, wherein the parameters comprise the following: a safety timer limit, a time extension amount, an emergency contact, a timer authentication code, and an emergency code;
selecting a property to view on the real estate mobile application by the user, wherein selecting the property includes selecting a time slot to view the property, and an address of the property;
initiating a GPS module of the safety engine during a period of time when the selected property is to be viewed;
receiving a check in button click on the real estate mobile application by the user or receiving input from the GPS module that the user has arrived at the property address;
initiating a timer once the check in button is clicked or when the GPS module identifies the user has arrived at the property;
prompting from the safety engine on the real estate mobile application a user for the timer authentication code;
entering by the user an emergency code; and
alerting from the real estate mobile application when the emergency code is entered after prompting.

11. The computer-implemented method of claim 10, further comprising alerting from the real estate mobile application at least an emergency contact or a local emergency medical situation hotline if the timer passes the safety timer limit or the user does not check out from viewing the property.

12. The computer-implemented method of claim 10, further comprising transmitting data back to a server the user's check in and check out history.

13. The computer-implemented method of claim 10, wherein alerting from the real estate mobile application also sends an email to the emergency contact.

14. The computer-implemented method of claim 10, wherein alerting from the real estate mobile application also emits an audible alert on the mobile computing device.

15. The computer-implemented method of claim 10, wherein alerting from the real estate mobile application also initiates a visual alert on the mobile computing device.

16. The computer-implemented method of claim 10, wherein the emergency code and the timer authentication code are four digits long.

17. The computer-implemented method of claim 10, further comprising transmitting the user's GPS coordinates to a data server when the user fails to enter either the emergency code or the timer authentication code.

18. The computer-implemented method of claim 10, further comprising checking out once the user enters the timer authentication code.

* * * * *